(12) United States Patent
Pascovici et al.

(10) Patent No.: US 11,893,998 B2
(45) Date of Patent: Feb. 6, 2024

(54) ADAPTIVE MANAGEMENT OF CASTING REQUESTS AND/OR USER INPUTS AT A RECHARGEABLE DEVICE

(71) Applicant: GOOGLE LLC, Mountain View, CA (US)

(72) Inventors: Andrei Pascovici, Bellevue, WA (US); Victor Lin, Fremont, CA (US); Jianghai Zhu, Santa Clara, CA (US); Paul Gyugyi, Sunnyvale, CA (US); Shlomi Regev, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 221 days.

(21) Appl. No.: 17/473,067

(22) Filed: Sep. 13, 2021

(65) Prior Publication Data

US 2021/0407518 A1 Dec. 30, 2021

Related U.S. Application Data

(63) Continuation of application No. 16/606,471, filed as application No. PCT/US2019/025256 on Apr. 1, 2019, now Pat. No. 11,120,804.

(51) Int. Cl.
*G10L 17/10* (2013.01)
*G10L 15/26* (2006.01)
*G10L 25/78* (2013.01)

(52) U.S. Cl.
CPC ............. *G10L 17/10* (2013.01); *G10L 15/26* (2013.01); *G10L 25/78* (2013.01); *G10L 2025/783* (2013.01)

(58) Field of Classification Search
None
See application file for complete search history.

(56) References Cited

U.S. PATENT DOCUMENTS

| 5,983,186 | A | 11/1999 | Miyazawa et al. |
| 7,877,401 | B1 * | 1/2011 | Hostetter ............ G06F 7/02 |
| | | | 707/758 |

(Continued)

FOREIGN PATENT DOCUMENTS

| JP | 2011049721 | 3/2011 |
| JP | 2019040602 | 3/2019 |

(Continued)

OTHER PUBLICATIONS

European Patent Office; Communication under Rule 71(3) EPC issued in Application No. 19717686.0; 63 pages; dated Dec. 1, 2022.

(Continued)

*Primary Examiner* — Neeraj Sharma
(74) *Attorney, Agent, or Firm* — Gray Ice Higdon

(57) ABSTRACT

Implementations set forth herein relate to management of casting requests and user inputs at a rechargeable device, which provides access to an automated assistant and is capable of rendering data that is cast from a separate device. Casting requests can be handled by the rechargeable device despite a device SoC of the rechargeable device operating in a sleep mode. Furthermore, spoken utterances provided by a user for invoking the automated assistant can also be adaptively managed by the rechargeable device in order mitigate idle power consumption by the device SoC. Such spoken utterances can be initially processed by a digital signal processor (DSP), and, based on one or more features (e.g., voice characteristic, conformity to a particular invocation phrase, etc.) of the spoken utterance, the device SoC can be initialized for an amount of time that is selected based on the features of the spoken utterance.

15 Claims, 11 Drawing Sheets

(56) References Cited

U.S. PATENT DOCUMENTS

| | | | |
|---|---|---|---|
| 8,385,971 B2* | 2/2013 | Rhoads | G06V 30/142 |
| | | | 382/312 |
| 9,734,822 B1 | 8/2017 | Sundaram et al. | |
| 9,906,375 B1* | 2/2018 | Roquemore, III | H04W 24/06 |
| 10,419,931 B1* | 9/2019 | Sohail | H04L 63/1425 |
| 10,964,319 B2 | 3/2021 | Park et al. | |
| 2013/0223635 A1 | 8/2013 | Singer et al. | |
| 2013/0289994 A1 | 10/2013 | Newman et al. | |
| 2014/0075348 A1* | 3/2014 | Sathish | G01C 21/3682 |
| | | | 715/764 |
| 2014/0122078 A1 | 5/2014 | Joshi et al. | |
| 2014/0214958 A1 | 7/2014 | Cheshire | |
| 2014/0244269 A1 | 8/2014 | Tokutake | |
| 2014/0257821 A1 | 9/2014 | Adams et al. | |
| 2015/0373505 A1 | 12/2015 | Hsieh | |
| 2016/0099940 A1 | 4/2016 | Enke | |
| 2016/0162227 A1* | 6/2016 | Kato | G06F 3/1206 |
| | | | 358/1.13 |
| 2016/0205730 A1 | 7/2016 | Harbers | |
| 2017/0251503 A1* | 8/2017 | Bao | H04W 76/11 |
| 2018/0032711 A1 | 2/2018 | Zhang et al. | |
| 2018/0077642 A1 | 3/2018 | Mandiganal | |
| 2018/0108351 A1 | 4/2018 | Beckhardt et al. | |
| 2018/0152827 A1* | 5/2018 | Perez | H04L 67/52 |
| 2018/0233150 A1 | 8/2018 | Gruenstein et al. | |
| 2018/0286403 A1 | 10/2018 | Gruber | |
| 2018/0294983 A1 | 10/2018 | Mani | |
| 2018/0324703 A1 | 11/2018 | Knudson et al. | |
| 2018/0330727 A1 | 11/2018 | Tuli | |
| 2019/0043507 A1 | 2/2019 | Huang et al. | |
| 2019/0073999 A1 | 3/2019 | Premont et al. | |
| 2019/0182204 A1* | 6/2019 | Kachalia | H04L 61/4511 |
| 2019/0320978 A1 | 10/2019 | Lee et al. | |
| 2020/0089517 A1* | 3/2020 | Paul | G06F 9/48 |
| 2020/0105256 A1 | 4/2020 | Fainberg et al. | |
| 2020/0128114 A1* | 4/2020 | Kloberdans | H04L 69/16 |
| 2020/0186378 A1 | 6/2020 | Six et al. | |
| 2020/0279558 A1 | 9/2020 | Li et al. | |

FOREIGN PATENT DOCUMENTS

| | | |
|---|---|---|
| KR | 20160014357 | 2/2016 |
| KR | 20160100765 | 8/2016 |
| WO | 2013163113 | 10/2013 |
| WO | 2018151772 | 8/2018 |

OTHER PUBLICATIONS

European Patent Office; Communication Pursuant to Article 94(3) EPC issued in Application No. 19717686.0; 4 pages; dated Mar. 24, 2021.

European Patent Office; International Search Report and Written Opinion issued in Application No. PCT/US2019/025256; 20 pages; dated Sep. 6, 2019.

European Patent Office; Invitation to Pay Additional Fees in Application No. PCT/US2019/025256; 15 pages, dated Jul. 11, 2019.

International Search Report and Written Opinion issued in Application No. PCT/US2019/025256 dated Jun. 9, 2019 (20 Pages).

Japanese Patent Office; Notice of Allowance issued in Application No. 2021-542498, 3 pages, dated Apr. 25, 2022.

Korean Patent Office; Office Action issued in Application No. KR10-2021-7024198; 35 pages; dated May 24, 2023.

European Patent Office; Communication issued in Application No. 23166189.3; 5 pages; dated Aug. 4, 2023.

Korean Patent Office; Decision of Rejection issued in Application No. KR10-2021-7024198; 9 pages; dated Oct. 10, 2023.

* cited by examiner

ADAPTIVE MANAGEMENT OF CASTING REQUESTS AND/OR USER INPUTS AT A RECHARGEABLE DEVICE

BACKGROUND

Limitations on charge capacity of batteries incorporated into portable electronic devices can influence utility of such portable electronic devices, especially given that each subsystem of such devices relies on at least some amount of energy to function. Furthermore, when a battery-powered device provides access to an automated assistant, energy resources can be further limited if the device is tasked with constantly processing audio data and/or other data for detection of invocation signal(s) that invoke the automated assistant. In instances when a battery-powered assistant device includes a device system on a chip (SoC), the device SoC can consume a substantial proportion of energy relative to other subsystems (e.g., network processor, digital signal processor (DSP), etc.) when the user is interacting with the automated assistant. For instance, substantial battery charge can be expended on performing speech processing, which can involve a processor eliminating various audio data artifacts, such as echo, static, and/or other noise.

The provision or streaming of content from one device for rendering on another device may be referred to as "casting". Battery-powered portable electronic devices capable of responding to casting requests can expend substantial amounts of battery charge when operating to constantly handle casting requests from local network devices. For instance, a battery-powered device that accepts casting-related pings and/or requests for "casting" media to the battery-powered device can employ the device SoC to process data embodied by incoming requests. However, as such requests become more frequent and/or redundant, using the device SoC to process the requests can exacerbate charge capacity limitations of the battery-powered device. As a result, although the battery-powered device would still be able to render casted data, a total amount of available casting time would be reduced as a consequence of how often the device SoC is required to process casting-related requests.

SUMMARY

Implementations described herein relate to rechargeable devices that adaptively manage cast requests and/or user inputs, while providing access to an automated assistant and/or one or more interfaces for rendering casted data provided by a separate computing device. The rechargeable device can be limited by having a finite power source, such as a battery, which can typically be depleted by operating the rechargeable device to frequently process cast requests and user inputs (e.g., a spoken utterance such as an invocation phrase). In order to extend time between charges, and also eliminate wasting of other computational resources, the rechargeable device can employ a variety of different subsystem operating schemes that are adapted to manage such requests and inputs.

For instance, in some implementations the rechargeable device can include a first processor, such as a digital signal processor (DSP), and a second processor, such as a device system on a chip (SoC) for handling various inputs according to an operating mode of the rechargeable device. The operating mode can be one of multiple operating modes, such as a sleep mode, in which the device SoC is powered down or otherwise consuming less power than if the device SoC was operating according to another operating mode (e.g., an operating mode in which an automated assistant can actively interact with a user via the rechargeable device). While the rechargeable device is operating in the sleep mode, the DSP can be powered on, in order to monitor, with permission from the user, for a user input to the rechargeable device. As an example, the rechargeable device can include one or more microphones and, when the rechargeable device is operating in the sleep mode, the DSP can monitor any outputs provided by one or more of the microphone(s) (e.g., outputs that characterize a spoken utterance from a user to the microphone). The DSP can operate a speech recognition model (e.g., an invocation phrase model) for determining whether a user has provided a spoken utterance corresponding to an invocation phrase (e.g., "Assistant . . . ") for invoking an automated assistant. When the DSP determines, using the speech recognition model, that the user has provided an invocation phrase for invoking the automated assistant, the DSP can cause the device SoC to initialize for further processing. For example, the device SoC can initialize for a particular period of "wake time" in order to await further instructions and/or input from the user.

An amount of time that the device SoC stays active can change over time according to various features associated with interactions between one or more users and the automated assistant. The amount of time can be adapted and/or determined in order to mitigate waste of computational resources and power, which might otherwise be expended operating a speech recognition model at the device SoC. For instance, the device SoC can operate another speech recognition model (e.g., a first invocation phrase model and/or voice activity detector) that is different from the speech recognition model (e.g., a second invocation phrase model and/or other voice activity detector) operated by the DSP, and that may necessitate more computational resources and/or power relative to the speech recognition model operated by the DSP. Therefore, by adapting the amount of "wake time" for the device SoC, unnecessary expenditure of battery power can be avoided while still ensuring that the rechargeable device can provide automated assistant functionality in an effective way.

In some implementations, the other speech recognition model operated by the device SoC can determine a voice characteristic of the user based on data provided by the DSP, such as audio data generated in response to the user providing an initial spoken utterance. Based on the determined voice characteristic, the device SoC can select a wake time for the device SoC to remain operational in furtherance of processing any subsequent inputs from the user. As an example, a first user can typically, and/or on average, delay a few seconds (e.g., three seconds) between providing an invocation phrase (e.g., "Assistant . . . ") and providing a command phrase (e.g., " . . . play my study playlist."). The device SoC can acknowledge this delay and select a wake time for device SoC that does not extend far beyond the average delay of the user. For instance, the selected wake time for the device SoC can be, but is not limited to: (wake time(s))=(determined average delay of the user(s))×(1+N), where "N" is any number such as, but not limited to 0.2, 0.5, etc. The same, or different, wake time can be selected for a different user that typically, and/or on average, delays a few seconds (e.g., 2 seconds) between providing an invocation phrase and providing a command phrase. In this way, a rechargeable device that includes the DSP and device SoC can adaptively manage "wake times" per user, in order to ensure responsiveness without wasting power and/or computational resources.

In some implementations, the speech recognition model operated by the DSP, and the other speech recognition model operated by the device SoC, can both be used to determine whether the user has provided a particular invocation phrase for invoking the automated assistant. However, the speech recognition model operated by the DSP can apply a standard, by which to determine whether the user provided an invocation phrase that is less stringent than a standard enforced by the other speech recognition model operated by the device SoC. In other words, the speech recognition model can be associated with a first accuracy threshold for determining whether a particular spoken utterance corresponds to an invocation phrase, and the other speech recognition model can be associated with a second accuracy threshold for determining whether the particular spoken utterance corresponds to the invocation phrase. As an example, the first accuracy threshold can be satisfied when the user provides a particular spoken utterance that is determined to include at least a portion of the invocation phrase but also includes some amount of background noise. However, that particular spoken utterance may not satisfy the second accuracy threshold because the second accuracy threshold may necessitate a higher degree of correlation between the particular spoken utterance and the invocation phrase—at least relative to a degree of correlation for satisfying the first accuracy threshold.

In some implementations, the DSP can operate a speech recognition model using less power, less data, fewer channels of audio, audio of a lower sampling rate, and/or audio of a lower quality relative to that which the device SoC uses with the other speech recognition model. For example, the DSP can receive a single channel of audio data when a user provides a spoken utterance to the rechargeable device, and the device SoC can receive multiple channels of audio data when the user provides the spoken utterance to the rechargeable device. Additionally, or alternatively, the DSP can operate using an average amount of power when employing the speech recognition model and the device SoC can operate using more power than the average amount of power when employing the other speech recognition model.

In some implementations, a degree of correlation, as determined by the DSP and/or the device SoC, can be used to select an amount of wake time for the device SoC to remain active for processing further inputs from the user. For example, when the device SoC determines a first degree of correlation between a spoken utterance and an invocation phrase, a first wake time can be selected by the device SoC. However, when the device SoC determines a second degree of correlation between another spoken utterance and the invocation phrase, and the second degree of correlation is greater than the first degree of correlation, the device SoC can select a second wake time that is longer than the first wake time. In this way, the amount of time that the device SoC remains active for anticipating further inputs from the user can be adapted according to a degree of accuracy and/or correlation between a spoken utterance from a user and an invocation phrase that is used to invoke the automated assistant. This can preserve computational resources at the rechargeable device by avoiding standard "wake times" that are indiscriminate of any content and/or context of a user input.

This may be particularly beneficial in instances in which the correlation between a spoken utterance from a user and an invocation phrase falls short of that required to invoke the automated assistant. This is because a "near miss" (that is a correlation that is nearly but not quite sufficient for invoking the assistant) is more likely to have resulted from an actual attempt to invoke the automated assistant (than is an utterance having a correlation that is a further from that required to invoke the assistant), so is more likely to be followed-up by the user re-attempting to invoke the assistant. Keeping the SoC active for longer when a "near miss" is detected may allow the device to handle the subsequent invocation attempt with less latency. Put another way, the device SoC can determine that a spoken utterance falls short of correlating to the invocation phrase by a particular degree, and so the device SoC can stay on for an amount of time based on the particular degree (e.g., an amount of time in seconds that is selected based and/or proportional to the particular degree). However, when the device SoC determines that another spoken utterance falls even shorter from correlating to the invocation phrase (e.g., falls short by an even greater degree), the device SoC can shut down much more quickly, in order to save power and computational resources.

When a spoken utterance is detected by the rechargeable device and the device SoC is initialized for further processing, there can be differences in clock settings of a clock that is operating at the DSP, and another clock that is operating at the device SoC. In order for the device SoC to process audio data generated and timestamped at the DSP, a time sync can be performed at the DSP and/or the device SoC in order to further eliminate wasting of computational resources involved in anticipating and/or responding to spoken utterance received at a rechargeable device. Such time synching may be particularly useful, for instance, when the SoC is outputting audio at the time at which a spoken utterance is received. Indeed, without the time syncing, processing captured audio data to remove the audio that was output by the SoC from the data corresponding to the utterance can be problematic.

In some implementations, time syncing can be performed by the device SoC using one or more timestamps generated at the device SoC and one or more other timestamps generated at the DSP. As an example, the DSP can generate a first timestamp, corresponding to a local time relative to the DSP, using a first clock. Additionally, the DSP can generate a second timestamp when the DSP causes the device SoC to initialize, for instance, in response to the DSP determining that a user has provided an invocation phrase. Upon receiving a signal (e.g., a wake and/or interrupt command) from the DSP, the device SoC can generate a third timestamp using a second clock, and the third timestamp can correspond to a local time relative to the device SoC.

In order to perform the time sync, the device SoC can generate a time offset using the first timestamp, the second timestamp, and the third timestamp, and thereafter employing the time offset when processing audio data generated at the DSP. In some implementations, the device SoC can determine an average value of the first timestamp and the second timestamp, and then determine a delta value corresponding to a difference between the average value and the third timestamp. The delta value can thereafter be used when processing audio data, such as when the device SoC is performing echo cancelation. During echo cancelation, the device SoC can use the delta value in order to remove, from audio recorded by a microphone, instances of audio being output by the rechargeable device. As an example, when the device SoC is generating audio output corresponding to music playback, and the user provides a spoken utterance to the microphone during the music playback, audio data characterizing the spoken utterance can be processed by the device SoC in order to remove instances of the music playback. Furthermore, this process of removing the instances of the music playback from the audio data can be accurately performed using the delta value determined by the device SoC and/or the DSP, thereby allowing device SoC "wake times" to be determined from accurate data. In other words, DSP generated timestamps can be converted to correlate to device SoC generated timestamps for purposes of performing certain audio processes, such as echo cancellation. Additionally, or alternatively, device SoC generated timestamps can be converted to correlate to DSP generated timestamps for purposes of performing those audio processes.

In some implementations, the rechargeable device can include one or more interfaces via which to render audio, visual, haptic, and/or any other type of output in response to a casting request from another computing device. However, although such casting requests may be provided by other rechargeable devices, such as a cell phone and/or a laptop computer, the computing device providing the casting request may provide such requests without regard for available power at the rechargeable device. In order to handle frequent cast requests while also eliminating wasting of rechargeable power, the rechargeable device can offload processing of certain requests to a subsystem of the rechargeable device rather than the device SoC. For instance, a WiFi chip of the rechargeable device can be delegated to handle particular requests received over a local area network (LAN) to which the rechargeable device and casting device are connected. In some implementations, the WiFi chip can handle certain cast requests while the device SoC remains in a sleep mode, in order to eliminate wasting of power and computational resources. Requests delegated to the WiFi chip for processing, without invoking the device SoC for additional processing, can be casting requests that specify one or more particular ports. Additionally, or alternatively, the WiFi chip can be delegated for processing mDNS broadcasted data without invoking the device SoC.

As an example, a user can operate a music application at their cellular device in order to stream music, and, during playback of the music, the user can initialize casting of the music to the rechargeable device. The cellular device can transmit a casting request, which can include mDNS broadcasted data, to a variety of different devices that are connected to the LAN with the rechargeable device. The rechargeable device can receive the casting request when the rechargeable device is operating according to a sleep mode, in which the device SoC is asleep, off, or otherwise in a lower power mode compared to if the rechargeable device was not operating according the sleep mode. The WiFi chip of the rechargeable device can initially process the casting request to determine whether the casting request specifies a particular port, and/or includes particular properties.

When the casting request specifies a particular port corresponding to one or more predetermined ports, the WiFi chip can bypass invoking the device SoC to respond to the casting request. Rather, the WiFi chip can rely on cached data stored in a memory of the WiFi chip in order to generate responsive data to transmit back to the cellular device over the LAN. Additionally, or alternatively, the WiFi chip can bypass invoking the device SoC in circumstances in which the mDNS broadcasted data, included with the casting request, specifies certain parameters of the casting request. For instance, the mDNS broadcasted data provided by the cellular device can indicate that an audio playback service is being requested and/or that a particular application initialized the casting request. The cached data of the WiFi chip can, based on previous interactions with one or more other devices, indicate that the rechargeable device supports the audio playback service and/or the particular application. Therefore, based on the available cached data, the WiFi chip can generate a response to the cellular device using the cached data, without invoking the device SoC for further information. In this way, the rechargeable device can reduce a number of instances in which the device SoC would otherwise be initialized for processing, thereby eliminating waste of the rechargeable power source (e.g., one or more batteries and/or capacitors) and computational resources.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
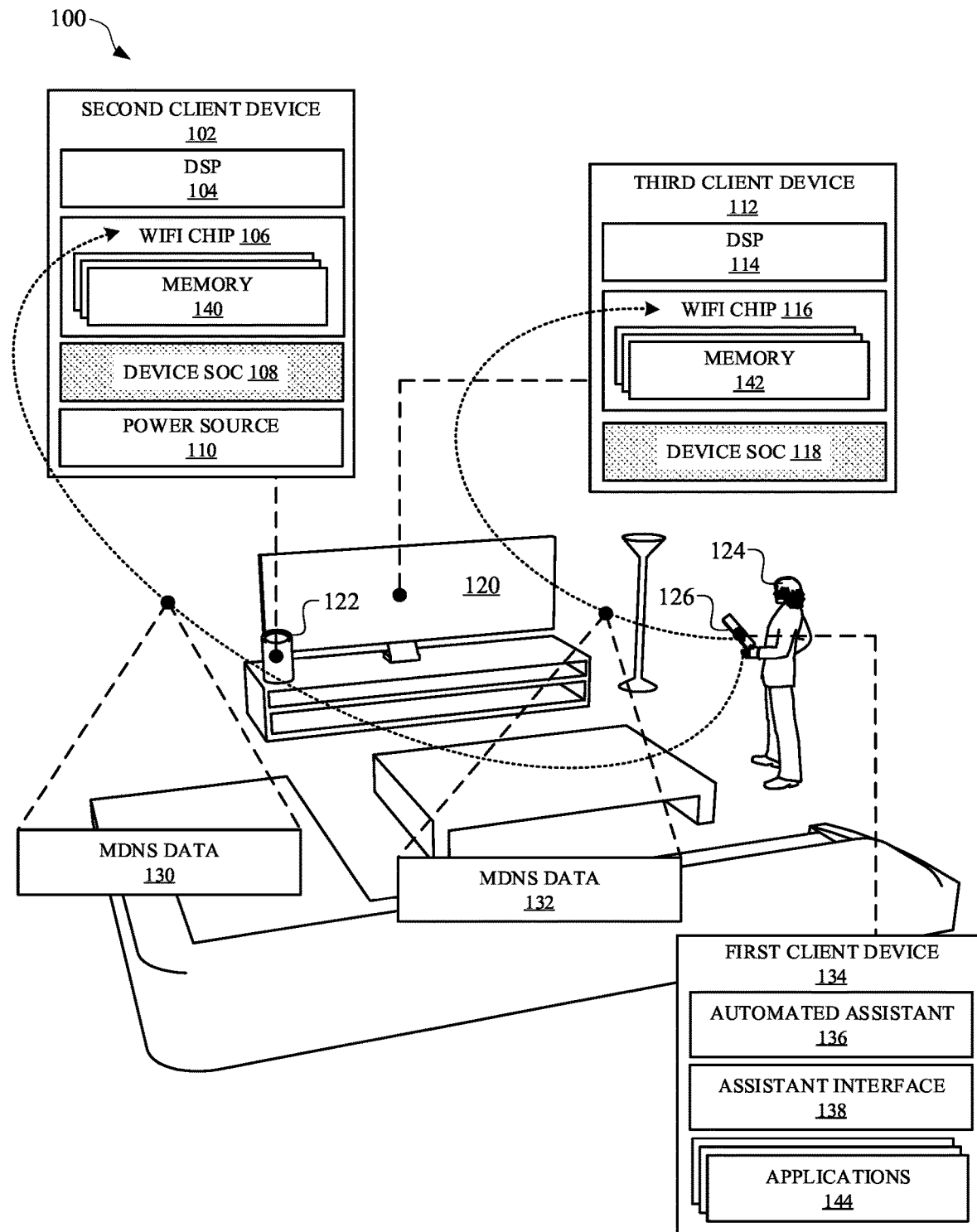
FIG. 1A and FIG. 1B illustrate views a user controlling a first client device to broadcast media to a separate client device, without transitioning all client devices on a local network out of their respective sleep states.

FIG. 1A illustrates a view 100 of a user 124 controlling a first client device 134 to broadcast media to a separate client device, without transitioning all client devices on a local network out of their respective sleep states. The first client device 134 can be a computing device such as a cellular phone 126 and/or any other device capable of casting media to another device. The first client device 134 can provide access to an automated assistant 136, which can be invoked via input to an assistant interface 138. The first client device 134 can also include one or more applications 144 capable of accessing media that can be cast from the first client device 134 to another client device. In some implementations, the first client device 134 can cast media to a separate client device in response to an input from the user 124 to the automated assistant 136. For instance, in response to the user checking for other devices that are available for casting media associated with an application 144, the first client device 134 can transmit mDNS data over a local area network to which multiple different client devices are connected.

The mDNS data that is broadcast by the first client device 134 can be transmitted over a local area network, such as a WiFi network, to a second client device 102 and/or a third client device 112. For example, mDNS data 130 can be transmitted from the first client device 134 to the second client device 102, and mDNS data 132 can be transmitted from the first client device 134 to the third client device 112. In some implementations, the second client device 102 can be a portable computing device that is powered by a portable power source 110. Furthermore, the third client device 112 can be powered by a portable power source and/or any other power source, such as a power source supplied by a utility service. The second client device 102 and the third client device 112 can operate in a sleep mode when each device receives the respective mDNS data. In other words, because the devices are operating in a sleep mode, a WiFi chip available at each device can process the mDNS data without causing each respective device to transition out of the sleep state. For example, a device SoC 108 and a device SoC 118 can operate in a sleep mode (as indicated by the gradient fill pattern) when the WiFi chip 106 and the WiFi chip 116 receive and respond to the mDNS data. In some implementations, a computing device can be considered in a "sleep mode" when at least the device SoC of the computing device is powered down or otherwise consuming less power than if the device SoC was operating according to another operating mode.

The WiFi chip 106 of the second client device 102 can process mDNS data 130 using cached data available in a memory 140 of the WiFi chip 106. Additionally, the WiFi chip 116 of the third client device 112 can process the mDNS data 132 using cached data available in a memory 142 of the WiFi chip 116. The mDNS data broadcast by the first client device 134 can identify an application that is associated with the broadcast, a port for transmitting the broadcast, a service being requested by the first client device 134, and/or any other feature that a computing device can specify when initializing casting.

Figure 1B:
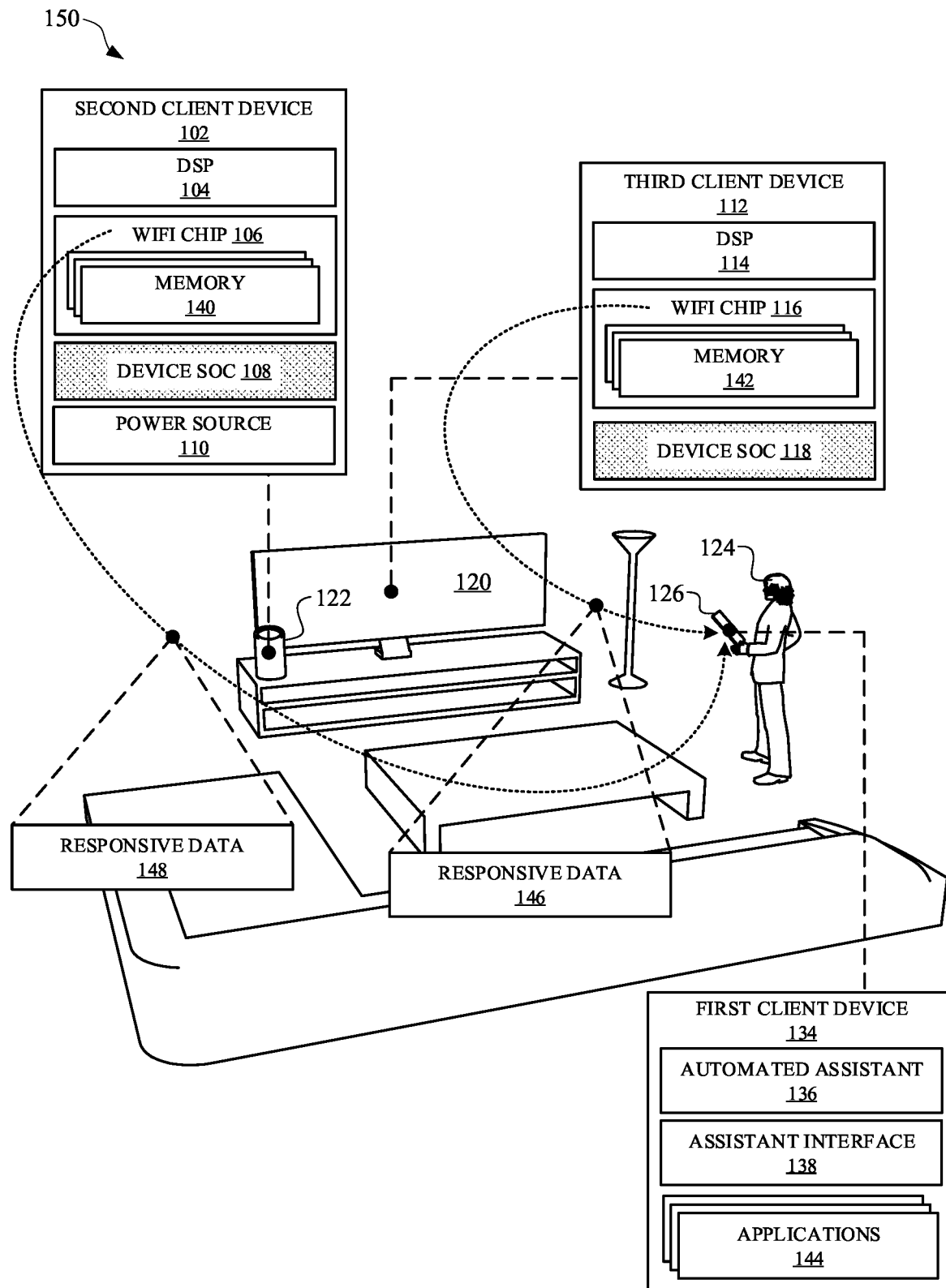

FIG. 1B illustrates a view 150 of the second client device 102 and the third client device 112 responding to the mDNS data that was transmitted to each respective client device. During generation and transmission of the responses data, each of the device SoC 108 and the device SoC 118 can remain in a sleep mode, thereby eliminating waste of power and computational resources. The responsive data 148 can indicate whether the second client device 102 includes one or more features being requested by the first client device 134, and the responsive data 146 can indicate whether the third client device 112 includes the one or more features being requested by the first client device 134. In response to the first client device 134 receiving the responsive data 148 and the responsive data 146 over the local network, the first client device 134 can provide a graphical interface that identifies one or more client devices that satisfy the request. The user 124 can then select one of the client devices for casting media. For example, when an application 144 requests to cast to a client device, and the user is presented with a list of client devices to select from for casting, the user can select the first client device 134.

In response to the selection, the application 144 can communicate directly with the first client device 134 over the local network, or the application can communicate with a separate server, in order to cause the separate server to communicate instructions to the first client device 134 for rendering particular media data via the first client device 134. In some implementations, the first client device 134 can be a standalone speaker device 122 and/or a display device capable of rendering audio and/or visual data. Alternatively, or additionally, the third client device 112 can be a display device, such as a computer monitor and/or a television. The second client device 102 and the third client device 112 can each include a digital signal processor, which can monitor a respective device interface through which to access an automated assistant when each respective device SoC is operating in a sleep mode. Furthermore, the digital signal processor (DSP), WiFi chip, device SoC, and/or any other subsystem of client device can operate according to any of the implementation discussed herein.

Figure 2A:
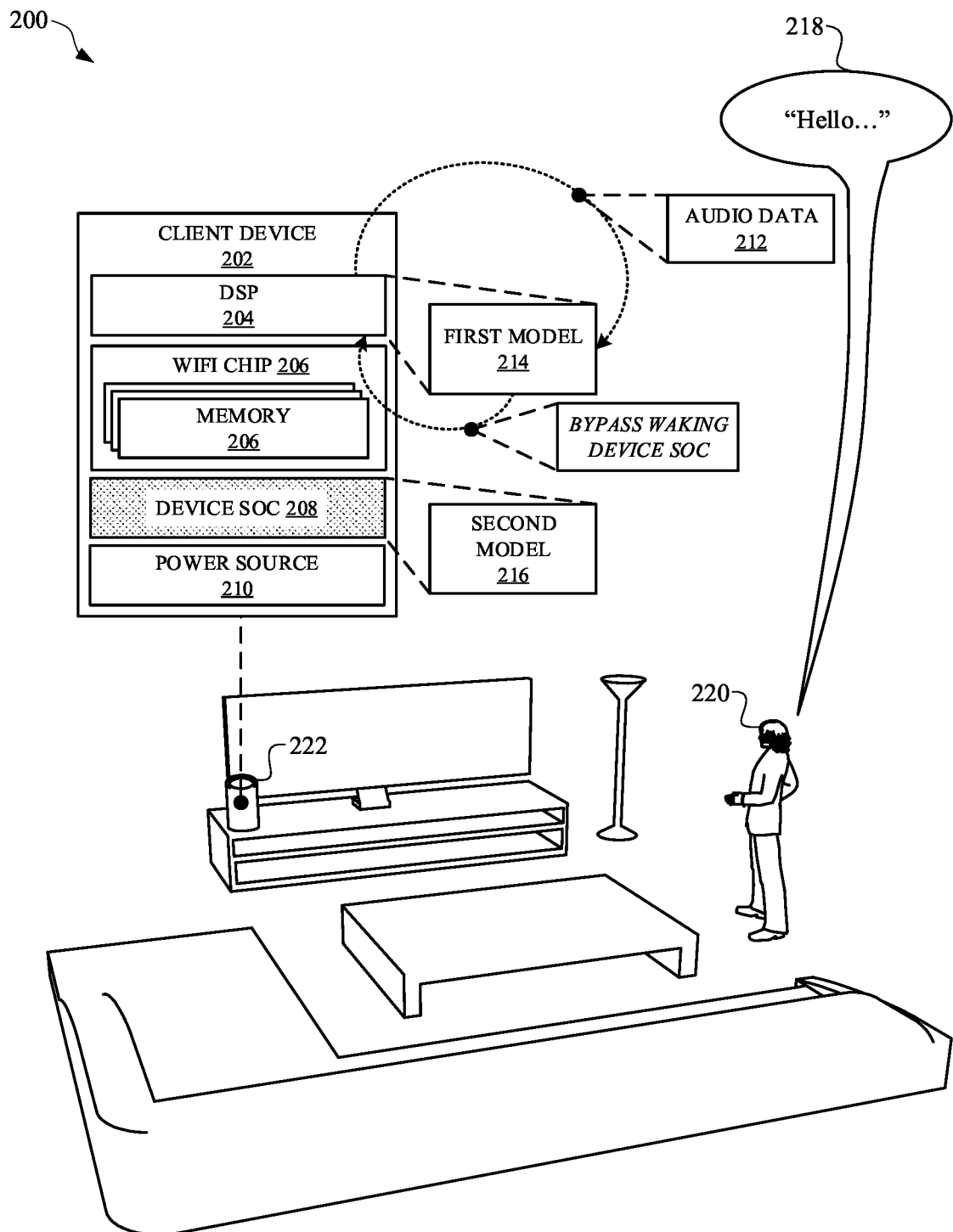
FIG. 2A, FIG. 2B, and FIG. 2C illustrate views of scenarios in which a device SoC is left in a sleep mode, or transitioned out of the sleep mode, according to implementations discussed herein.

FIG. 2A illustrates a view 200 of a user 220 providing a spoken utterance 218 to a client device 202, and causing the client device 202 to process the spoken utterance 218 using a digital signal processor, without transitioning a device SoC 208 out of a sleep mode. The client device 202 can be a computing device 222 that operates via a power source 210, which can include a rechargeable power source such as a battery, capacitor, and/or any other rechargeable energy source. When the client device 202 is operating with the device SoC 208 in the sleep mode, the user 220 can provide the spoken utterance 218, which can be different from an invocation phrase that would cause the client device 202 to transition the device SoC 208 out of the sleep mode. For example, the user 220 can provide spoken utterance 218, "Hello . . . ," which can be received at one or more microphones connected to the client device 202.

A microphone connected to the client device 202 can provide an output in response to the user 220 providing the spoken utterance 218. Despite the device SoC 208 operating in a sleep mode, a digital signal processor DSP 204 of the client device 202 can monitor the output of the microphone to determine whether a user has provided an invocation phrase of one or more invocation phrases that can invoke the client device 202 to perform one or more different actions. In some implementations, the DSP 204 can process audio data 212 that characterizes the spoken utterance 218 according to a process that utilizes a lower sampling rate than a sampling rate used by the device SoC 208 to process audio data. Alternatively, or additionally, the DSP 204 can process audio data 212 generated based on output from a fewer number of microphones relative to a number of microphones used to generate audio that is processed by the device SoC 208. In other words, the DSP 204 can utilize less channels of audio data as compared to a quantity of channels utilized by the device SoC 208. Utilizing a lower sampling rate and/or less channels can be computationally efficient and minimize power consumption (and resultant battery drain). Alternatively, or additionally, the DSP 204 can access a first model 214 for processing the audio data 212 to determine whether the user 220 has provided an invocation phrase.

The first model 214 can be different from a second model 216 that is employed by the device SoC 208 to determine whether the user 220 has spoken an invocation phrase. For example, the first model 214 can be a model trained for determining whether audio data characterizes an invocation phrase. The correspondence between the audio data and the invocation phrase can be characterized as one or more values, and a threshold degree of similarity between the audio data and the invocation phrase can be lower relative to another threshold degree that corresponds to the second model 216. In other words, a spoken utterance can be determined to satisfy the threshold of the first model 214 but not the threshold of the second model 216, but a spoken utterance cannot be determined to satisfy the second model 216 and not satisfy the first model 214.

In various implementations the second model 216 is, relative to the first model 214), larger (bits wise) and can have a larger input dimension (e.g., to handle more channels of audio data) and/or a larger quantity of trained nodes. As a result, processing audio data utilizing the second model 216 can be more computationally expensive relative to processing audio data utilizing the first model 214. However, in some implementations processing audio data utilizing the second model 216 can result in a more accurate determination of whether the user 220 has spoken an invocation phrase, as a result of the second model 216 being larger, more channels of audio data being processed, higher precision samples, and/or a higher sampling rate of audio data being processed. Accordingly, the DSP 204 can utilize the more efficient first model 214 to determine whether audio data passes an "initial check" for presence of an invocation phrase, and the SoC 208 and less efficient (but higher accuracy) second model 216 only utilized if the "initial check" is passed. This is more efficient, resource-wise, than utilizing only the SoC 208 and the second model 216.

In some implementations, the DSP can 204 can process audio data at a different bit depth relative to a bit depth that the device SoC 208 processes audio data. For instance, the DSP 204 can capture audio data as 24-bit audio but convert the audio data to 16-bit audio data, and then using the 16-bit audio data when determining whether the audio data characterizing an invocation phrase provided by the user. When the DSP 204 determines that the 16-bit audio data characterizes an invocation phrase, the DSP 204 can cause the captured 24-bit audio data to be forwarded to the device SoC 208. The device SoC 208 can then process the 24-bit audio data, rather than converting the forwarded audio data to a different bit depth for processing.

In response to the user 220 providing the spoken utterance 218, the DSP 204 can process the audio data 212 using the first model 214, and determine that the spoken utterance 218 does not correspond to an invocation phrase of one or more invocation phrases. In response, the DSP 204 can bypass waking the device SoC 208 for further processing. In this way, the device SoC 208 can remain in the sleep mode without having to be frequently initialized in order to further process the audio data 212. This allows the client device 202 to eliminate waste of energy provided by the power source 210, and computational resources available at the client device 202.

Figure 2B:
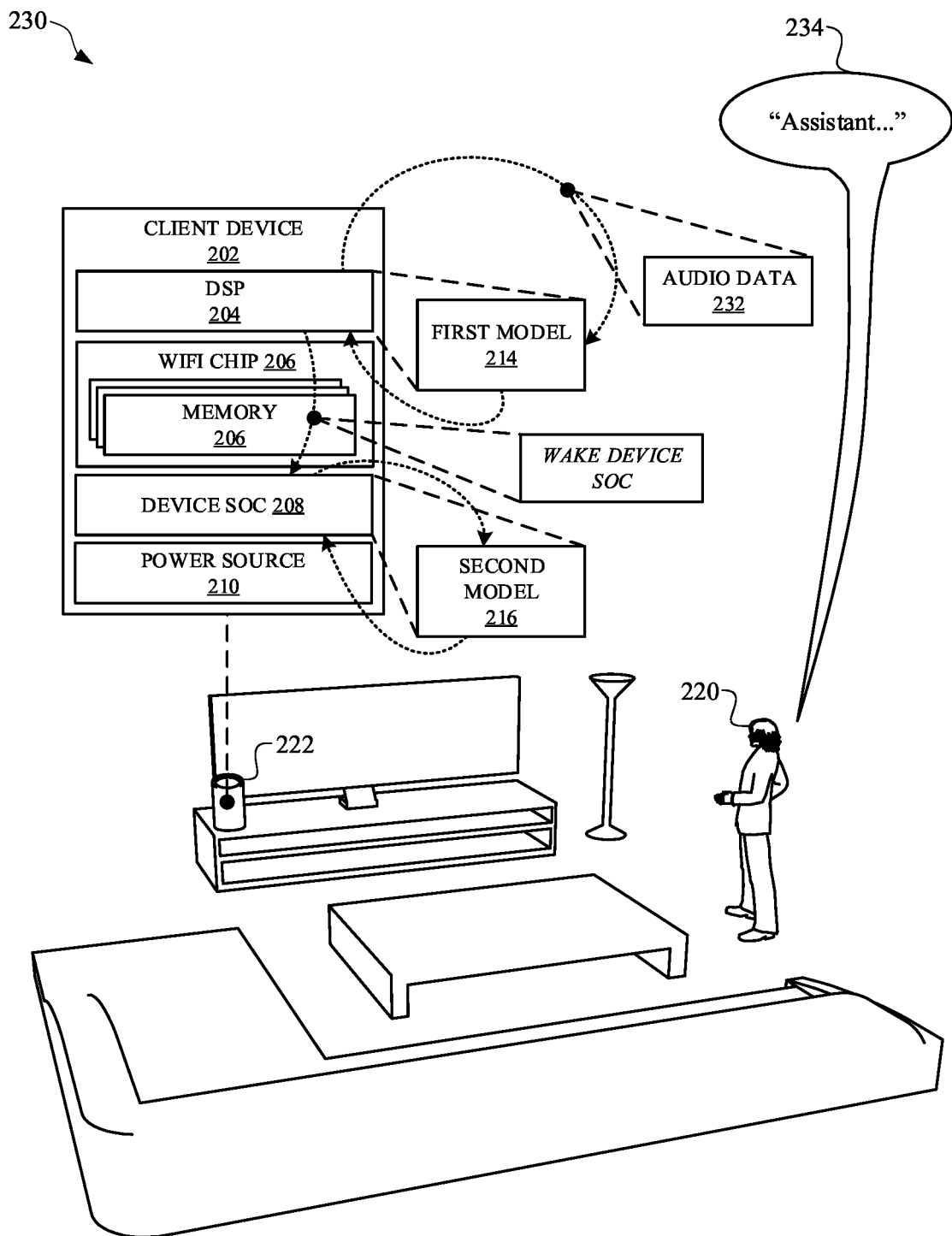

FIG. 2B illustrates a view 230 of a user providing a spoken utterance 234 to a client device 202, and causing a DSP 204 of the client device 202 to wake up a device SoC 208 of the client device 202. The spoken utterance 234 can be captured by one or more or microphones of the client device 202, which can be a computing device 222 that operates from a portable and/or rechargeable power source 210. Initially, the device SoC 208 can operate in a sleep mode in order to save power and computational resources. While the device SoC 208 is operating in the sleep mode, the DSP 204 can operate to detect when a user 220 provides a spoken utterance corresponding to one or more invocation phrases.

As an example, the user 220 can provide a spoken utterance 234 such as, "Assistant," which can correspond to an invocation phrase that, when detected by the DSP 204, can cause the DSP 204 to wake the device SoC 208. In order to detect the invocation phrase, the DSP 204 can convert an output from one or more microphones of the client device 202 into audio data 232. The DSP 204 can use a first model 214 in order to process the audio data 232 to determine whether the spoken utterance 234 corresponds to the invocation phrase. When the DSP 204 determines that the spoken utterance 234 corresponds to the invocation phrase, the DSP 204 can transmit a command to the device SoC 208 in order to wake up the device SoC 208, or otherwise cause the device SoC 208 to transition out of a sleep mode.

When the DSP 204 causes the device SoC 208 to transition from the sleep mode to an operating mode, the DSP 204 can also transmit audio data to the device SoC 208 for further processing. The device SoC 208 can then process the audio data using a second model 216 for confirming whether the spoken utterance 234 corresponds to an invocation phrase. When the device SoC 208 determines that the spoken utterance 234 did not correspond to an invocation praise, the device SoC 208 can transition back into a sleep mode in order to preserve computational resources and power. Alternatively, or additionally, when the device SoC 208 determines that the spoken utterance 234 does not correspond to an invocation phrase, but that the DSP 204 did determine that the spoken utterance 234 corresponded to an invocation phrase, the device SoC 208 can remain active or awake for a period of time at least in anticipation of further input from the user 220. In some implementations, the wake time can be based on a degree of correlation between the spoken utterance 234 and an invocation phrase, a voice identification of the user 220, and/or any other implementation feature discussed herein. As an example, the wake time can be determined based on a comparison between a degree of correlation detected by the device SoC 208 and a threshold degree of correlation. For instance, when the degree of correlation detected by the device SoC 208 is 0.87 and the threshold degree of correlation is 0.9, the device SoC 208 wake time can be set for a time period X. However, if the degree of correlation detected by the device SoC 208 is 0.79 and the threshold degree of correlation is 0.9, the device SoC 208 wake time can be set for a time period Y, where Y is less than X.

Figure 2C:
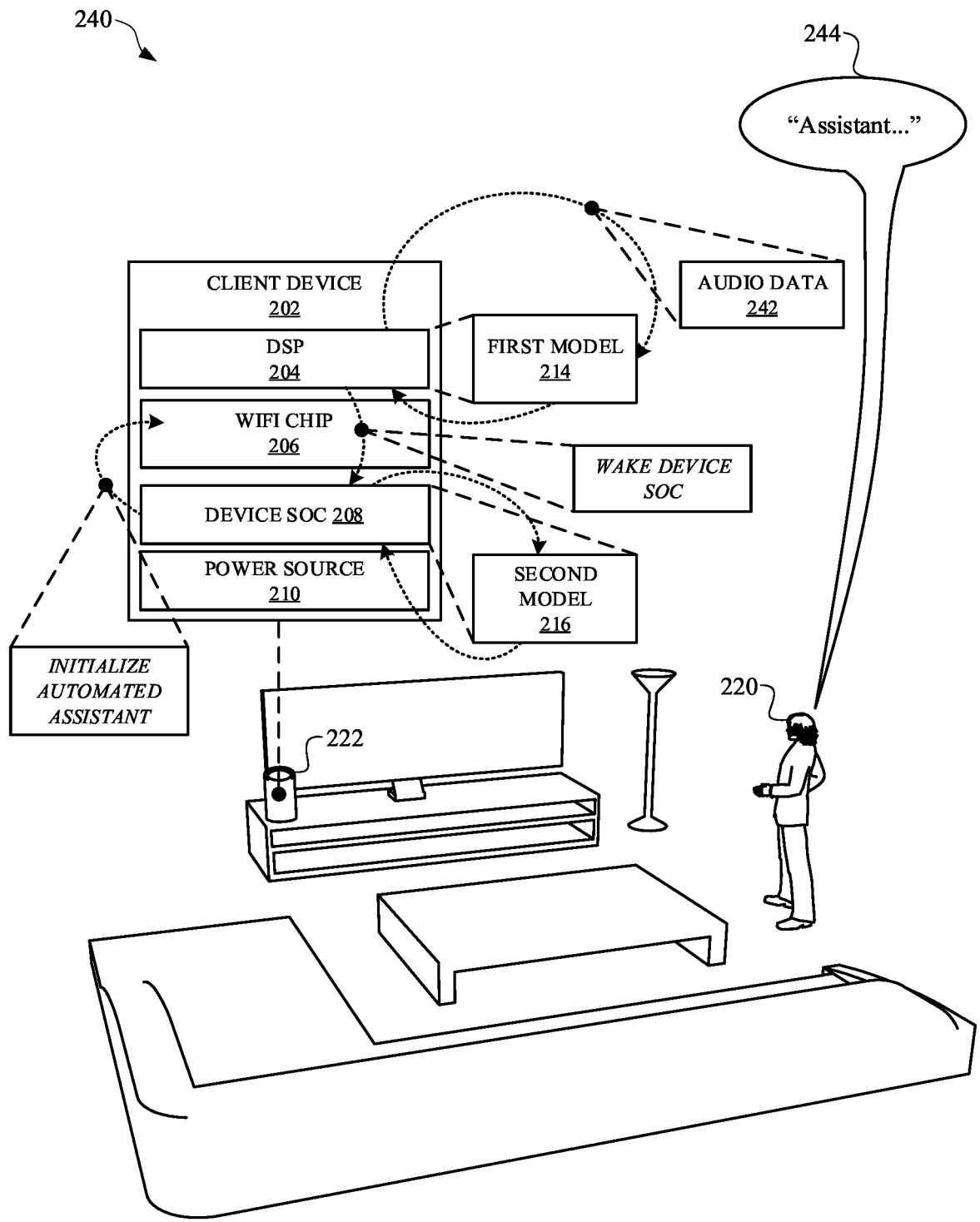

FIG. 2C illustrates a view 240 of a spoken utterance 244 being provided by a user 220 and causing a DSP 204 of a computing device 202 to transition a device SoC 208 out of a sleep mode, and further initialize an automated assistant for further operations. The client device 202 can be a computing device 222 that includes one or more different interfaces for interacting with an automated assistant. In order to initialize the automated assistant, the user 220 can provide an invocation phrase that is detected by the DSP 204 when the device SoC 208 is in a sleep mode. The invocation phrase can be embodied in a spoken utterance 244 that, when detected by the DSP 204, is processed using audio data 242 and a first model 214. When the DSP 204 determines, using the first model, that the audio data 242 characterizes an invocation phrase, the DSP 204 can provide a wake command to the device SoC 208.

In response to the device SoC 208 receiving the wake command, the device SoC 208 can process audio data corresponding to the spoken utterance 244 using a second model 216. Based on processing of the audio data using the second model 216, the device SoC 208 can determine that the spoken utterance 244 included an invocation phrase. Therefore, based on the device SoC 208 determining that the user 220 provided the invocation phrase, the device SoC 208 can locally initialize the automated assistant, and/or provide a network request to initialize the automated assistant via a server device. For example, the device SoC 208 can transmit data to a WiFi chip 106 of the client device 202 for initializing the automated assistant. The data can be transmitted over a network, such as the internet, to an automated assistant server in order that subsequent requests from the user can be transmitted via the client device 202 to the automated assistant server. In some implementations, the automated assistant can be hosted at the client device 202, therefore requests from the user 220 for the automated assistant to perform a particular operation can be processed at the client device 202. By allowing the device SoC 208 to sleep to save power and other resources, and wake in order to verify certain spoken utterances from the user 220, the client device 202 can preserve computational and power resources, which can be especially advantageous for a client device 202 that operates using a rechargeable power source 210.

Figure 3:
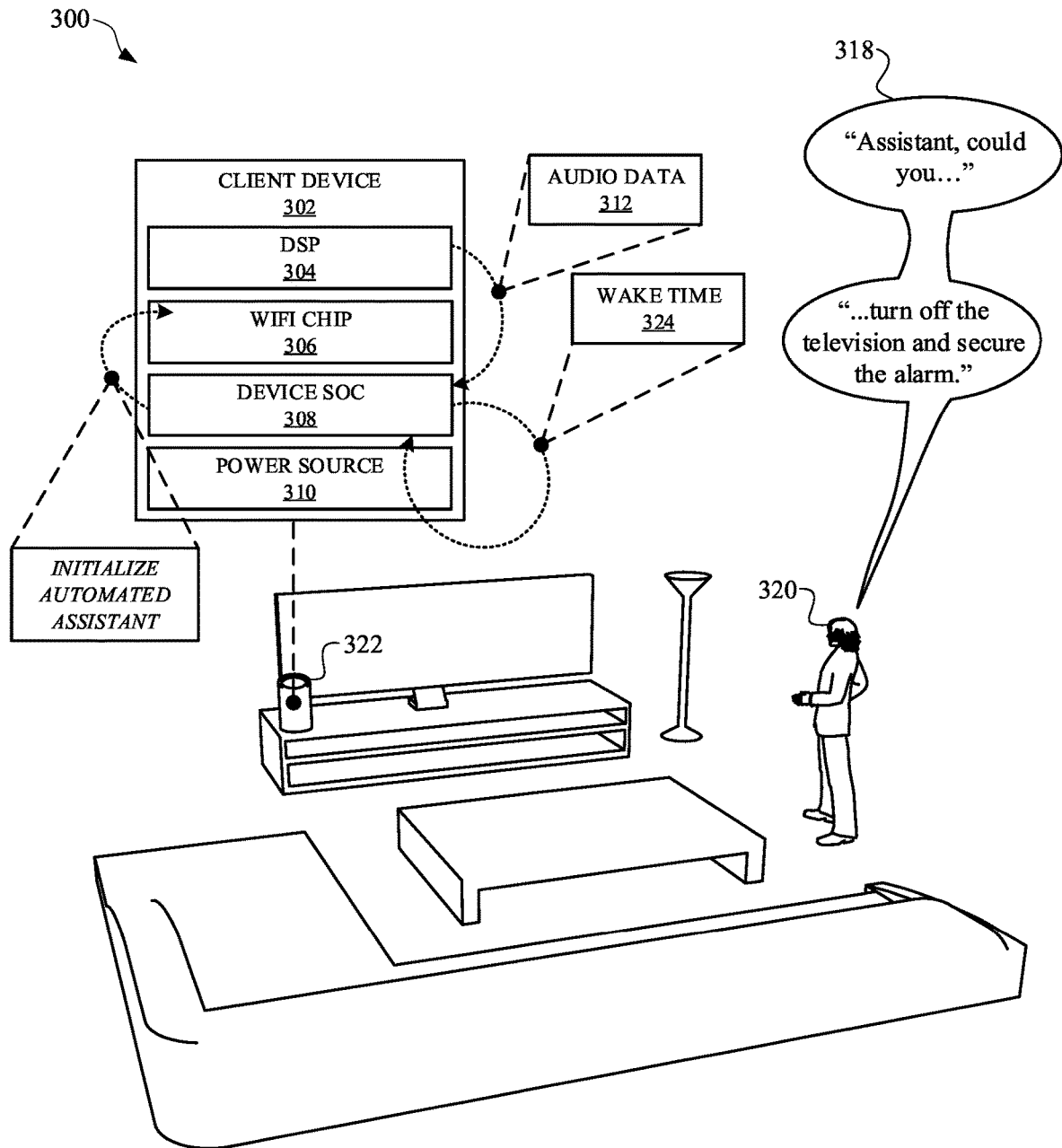
FIG. 3 illustrates a view a client device that can determine a wake time for a device SoC based on one or more properties associated with an interaction between a user and the client device.

FIG. 3 illustrates a view 300 a client device 302 that can determine a wake time for a device SoC 308 based on one or more properties associated with an interaction between a user 320 and the client device 302. The user 320 can interact with the client device 302 in order to invoke an automated assistant to perform one or more different functions. For example, the client device 302 can be a standalone speaker device 322, which can render audio, such as music, and/or control various other client devices that are connected to a common network with the client device 302. The client device 302 can be controlled by multiple different users who have different styles of speaking and/or interacting with the client device 302. In order to accommodate such differences between users while also eliminating waste of power and computational resources, the client device 302 can determine a wake time 324 for a device SoC 308 for limiting an amount of time device SoC 308 will monitor for inputs from the user 320.

As an example, the user 320 can provide a spoken utterance 318 such as, "Assistant, could you . . . ," and thereafter briefly pause to consider how to continue the spoken utterance. The user 320 can have a habit or history of exhibiting such pauses when interacting with the client device 302. Therefore, data characterizing previous interactions between the user 320 and of the client device can be used to determine how long to monitor for further inputs from the user 320 without wasting resources of the client device 302. For instance, in response to the spoken utterance 318, a DSP 304 of the client device 302 can process audio data 312 characterizing the spoken utterance 318 to determine whether the audio data 312 characterizes an invocation phrase, such as "Assistant." When the DSP 304 determines that the spoken utterance 318 includes the invocation phrase, the DSP 304 can communicate with the device SoC 308 in order to cause the device SoC 308 to transition from a sleep mode to an operating mode. In some implementations, the DSP 304 can also transmit audio data 312 to the device SoC 308 to confirm that the user 320 provided the invocation phrase.

In some implementations, when the device SoC 308 determines that the user 320 did provide the invocation phrase, the device SoC 308 can further process the audio data 312 in order to identify the user that provided the spoken utterance 318. For example, the device SoC 308 can access a voice identification model, with permission from the user, in order to identify one or more voice characteristics embodied by the audio data 312. Based on the voice characteristics embodied by the audio data 312, the device SoC 308 can rank one or more different users according to whether the spoken utterance 318 corresponds to their particular voice characteristic. A highest ranking user can then be selected as the user that provided the spoken utterance 318, and the device SoC 308 can determine the wake time 324 based on identifying the highest ranking user. Alternatively, or additionally, the user can be selected by the device SoC 308 using one or more models, which can be used to generate a prediction for the source of the spoken utterance 318. Alternatively, or additionally, the audio data 312 can be processed using one or more models, which can also be used to generate the wake time 324.

In response to determining that the user 320 provided the invocation phrase, the device SoC 308 can communicate with a WiFi chip 306 in order to initialize an automated assistant over a wide area network, such as the internet. However, in some implementations, the device SoC 308 can initialize the automated assistant via a local device that is in communication with the client device 302 over a local area network. While the automated assistant is initializing, the device SoC 308 can monitor one or more interfaces of the client device 302 for at least the amount of time that is equal to the wake time of 324. When the wake time 324 expires, the device SoC 308 can return to the sleep mode, and the DSP 304 can take over monitoring outputs from one or more interfaces of the client device 302.

In some implementations, the wake time 324 can be based on a determined degree of correlation between the spoken utterance 318 and an invocation phrase. For example, the device SoC 308 and/or the DSP 304 can generate a value that characterizes the degree of correlation between the spoken utterance 318 and an invocation phrase. The amount of wake time 324 can decrease as the degree of correlation increases, and the amount of wake time 324 can increase as the degree of correlation decreases. In other words, the device SoC 308 determines that the spoken utterance 318 is within a 10% tolerance of a threshold for confirming that the spoken utterance 318 includes the invocation phrase, the wake time 324 can be one minute. However, when the device SoC 308 determines the spoken utterance 318 does include the invocation phrase and therefore satisfies the threshold, the wake time 324 can be set at 5 seconds. It should be noted that the wake time can be any amount of milliseconds, seconds, minutes, and/or any other time value upon which operations of a processor can be based. For instance, a spoken utterance that more closely correlates to the invocation phrase can result in a wake time that has less total milliseconds then a wake time resulting from a different spoken utterance that less closely correlates to the invocation phrase.

Figure 4:
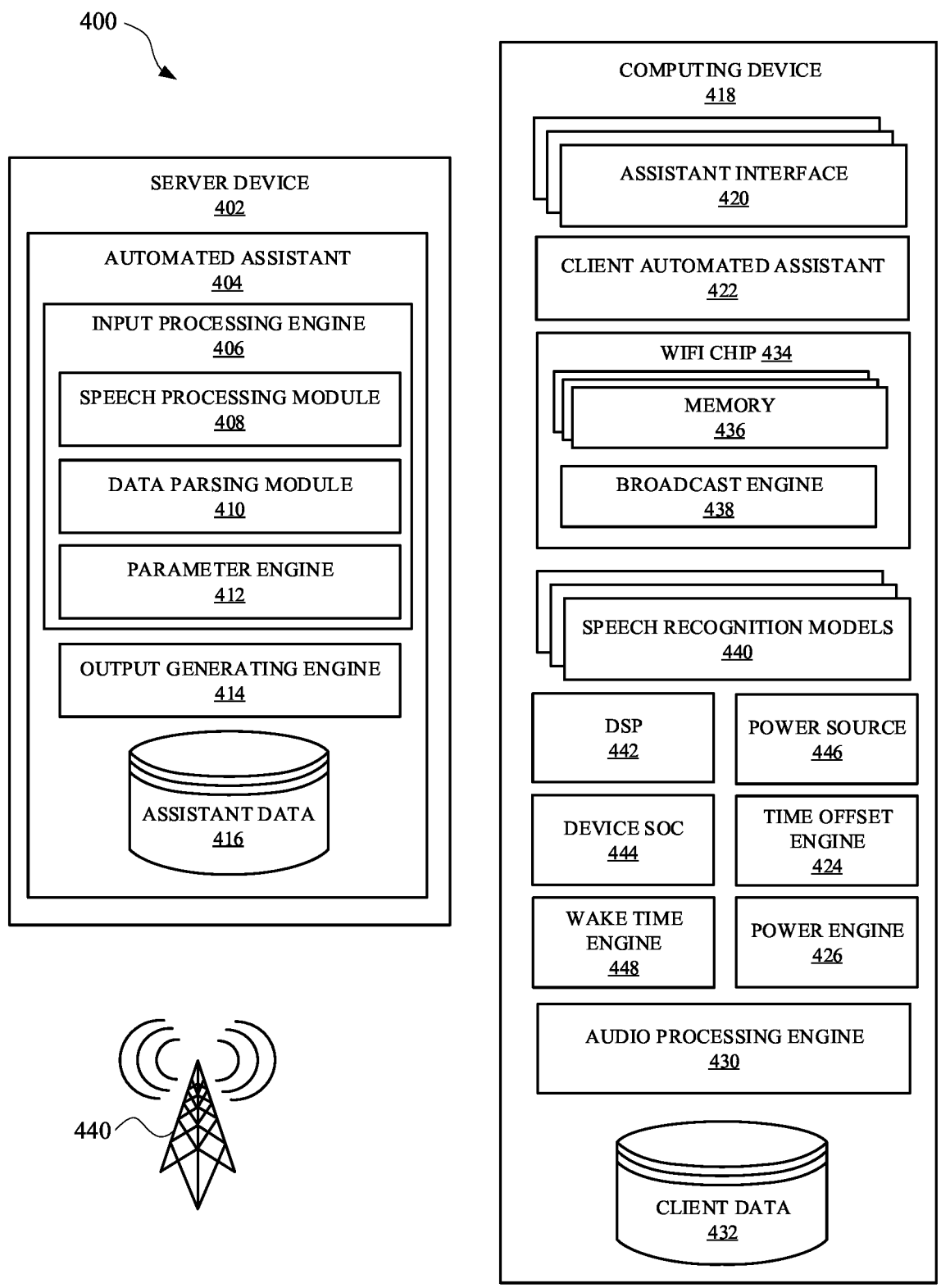
FIG. 4 illustrates a system for generating wake times for a device SoC, generating time offsets between a DSP clock and a device SoC clock, and/or employing a WiFi chip to respond to casting requests without transitioning the device SoC out of a sleep mode.

FIG. 4 illustrates a system 400 for operating a computing device 418 to eliminate waste of computational resources by generating wake times for a device SoC 444, generating time offsets between a DSP 442 clock and a device SoC 444 clock, and/or employing a WiFi chip 434 to respond to casting requests without transitioning the device SoC 444 out of a sleep mode. The automated assistant 404 can operate as part of an assistant application that is provided at one or more computing devices, such as a computing device 418 and/or a server device 402. A user can interact with the automated assistant 404 via an assistant interface, which can be a microphone, a camera, a touch screen display, a user interface, and/or any other apparatus capable of providing an interface between a user and an application.

For instance, a user can initialize the automated assistant 404 by providing a verbal, textual, and/or a graphical input to the assistant interface to cause the automated assistant 404 to perform a function (e.g., provide data, control a peripheral device, access an agent, generate an input and/or an output, etc.). The computing device 418 can include a display device, which can be a display panel that includes a touch interface for receiving touch inputs and/or gestures for allowing a user to control applications of the computing device 418 via the touch interface. In some implementations, computing device 418 can lack a display device, thereby providing an audible user interface output, without providing a graphical user interface output. Furthermore, the computing device 418 can provide a user interface, such as a microphone, for receiving spoken natural language inputs from a user. In some implementations, the computing device 418 can include a touch interface and can be void of a camera, but can optionally include one or more other sensors.

The computing device 418 and/or other computing devices 434 can be in communication with the server device 402 over a network 440, such as the internet. Additionally, the computing device 418 and the other computing devices 434 can be in communication with each other over a local area network (LAN), such as a WiFi network. The computing device 418 can offload computational tasks to the server device 402 in order to conserve computational resources at the computing device 418. For instance, the server device 402 can host the automated assistant 404, and computing device 418 can transmit inputs received at one or more assistant interfaces 420 to the server device 402. However, in some implementations, the automated assistant 404 can be hosted at the computing device 418 as a client automated assistant 422.

In various implementations, all or less than all aspects of the automated assistant 404 can be implemented on the computing device 418. In some of those implementations, aspects of the automated assistant 404 are implemented via the client automated assistant 422 of the computing device 418 and interface with the server device 402 that implements other aspects of the automated assistant 404. The server device 402 can optionally serve a plurality of users and their associated assistant applications via multiple threads. In implementations where all or less than all aspects of the automated assistant 404 are implemented via a client automated assistant 422 at the computing device 418, the client automated assistant 422 can be an application that is separate from an operating system of the computing device 418 (e.g., installed "on top" of the operating system)—or can alternatively be implemented directly by the operating system of the computing device 418 (e.g., considered an application of, but integral with, the operating system).

In some implementations, the automated assistant 404 and/or the client automated assistant 422 can include an input processing engine 406, which can employ multiple different modules for processing inputs and/or outputs for the computing device 418 and/or the server device 402. For instance, the input processing engine 406 can include a speech processing module 408 that can process audio data received at an assistant interface 420 to identify the text embodied in the audio data. The audio data can be transmitted from, for example, the computing device 418 to the server device 402 in order to preserve computational resources at the computing device 418.

The process for converting the audio data to text can include a speech recognition algorithm, which can employ neural networks, and/or statistical models for identifying groups of audio data corresponding to words or phrases. The text converted from the audio data can be parsed by a data parsing module 410 and made available to the automated assistant as textual data that can be used to generate and/or identify command phrases from the user. In some implementations, output data provided by the data parsing module 410 can be provided to a parameter module 412 to determine whether the user provided an input that corresponds to a particular action and/or routine capable of being performed by the automated assistant 404 and/or an application or agent that is capable of being accessed by the automated assistant 404. For example, assistant data 416 can be stored at the server device 402 and/or the computing device 418, as client data 432, and can include data that defines one or more actions capable of being performed by the automated assistant 404 and/or client automated assistant 422, as well as parameters necessary to perform the actions.

In some implementations, the computing device can include a WiFi chip 434, which can include at least one or more portions of memory 436 and/or a broadcast engine 438. The broadcast engine 438 can receive broadcasted data from one or more other client devices over a network 440, and generate responsive data using cached data stored in the memory 436. The WiFi chip 434 can store data that characterizes available services, applications, hardware features, and/or any other properties and/or functions that can be associated with the computing devices 418. When the computing device 418 is operating in a sleep mode, in which the device SoC 444 is consuming less power and/or computational resources relative to when the computing device 418 is operating in a wake mode, the WiFi chip 434 can be responsive to casting requests from other client devices without causing the device SoC 444 to transition out of the sleep mode.

For example, when a request from a client device is received at the WiFi chip 434, and the request identifies a targeted service that is also characterized by data stored in the memory 436, the broadcast engine 438 can generate responsive data using cached data from the memory 436, and provide the responsive data to the client device. Should the client device select the computing device 418 to employ the targeted service, the client device can transmit a command to the computing device 418, and the WiFi chip 434 can process the command and cause the device SoC 444 to transition out of the wake mode into an operating mode. However, in instances where the broadcast engine 438 determines that the memory 436 does not include sufficient data to determine whether the computing device 418 can provide a particular service, initialize a particular application, and/or otherwise serve the requesting client device, the WiFi chip 434 can communicate to the device SoC 444 in order to process the request. In this instance, the device SoC 444 can generate the responsive data, provide the responsive data to the WiFi chip 434, and the WiFi chip 434 can transmit the responsive data to the client device.

In some implementations, the computing device 418 includes one or more assistant interfaces 420, which can provide access to a client automated assistant 422 and/or an automated assistant 404. A user can provide one or more different types of inputs in order to invoke the client automated assistant 422 and/or the automated assistant 404. Such inputs can include spoken inputs, which can be processed by a digital signal processor 442 when the device SoC 444 is operating in the sleep mode. One or more speech recognition models 440 available at the computing device 418 can be used to determine whether audio data characterizing a spoken input embodies an invocation phrase for initializing an automated assistant. Furthermore, one or more speech recognition models 440 can be used by a wake time engine 448 to determine an amount of time the device SoC 444 should remain awake in order to detect subsequent inputs from a user. In some implementations, the amount of wake time can be based on a degree of similarity between a spoken utterance of the user and an invocation phrase for invoking an automated assistant. Alternatively, or additionally, the amount of wake time can be based on an audio processing engine 430 processing audio data corresponding to the spoken utterance and identifying a user that provided the spoken utterance. For example, the audio processing engine 430 can use client data 432 and/or assistant data 416 to determine characteristics of interactions between users and automated assistants, such as how long a user typically pauses during interactions with the automated assistant. The wake time engine 448 can use this information to generate a wake time for the device SoC 444 during a particular interaction between a user and the automated assistant.

Additionally, or alternatively, a power engine 426 of the computing device 418 can determine an estimated charge of a power source 446 and communicate the estimated charge and/or an amount of operating time to the wake time engine 448. The amount of charge and/or the amount of operating time estimated by the power engine for engine 26 can be used by the wake time engine 448 to determine a wake time for the device as SoC 444. For example, when a user that typically pauses more than an average user when interacting with the automated assistant, and the power source 446 has a full charge, the wake time engine 448 can assign an extended wake time, at least relative to a wake time that would otherwise be assigned if the estimated charge was below 50%. Alternatively, or additionally, when a user that typically pauses less than an average user that is interacting with the computing device 418, and the power source 446 has a full charge, the wake time engine 448 can assign a smaller wake time relative to the extended wake time, at least based on the historical interactions of the user and in order to preserve power.

In some implementations, the computing device 418 can include a time offset engine 424 for determining an offset between clocks that are used by the computing device 418. For example, the DSP 442 can operate a first clock and the device SoC 444 can operate a second clock, which can be offset from the first clock during operations of the computing device 418. This offset can influence operations at the audio processing engine 430, especially when the audio processing engine 430 is performing echo cancellation on spoken inputs to the assistant interface 420.

In some implementations, an offset between a first clock by which the DSP 442 operates and a second clock by which the device SoC 444 operates can be determined using timestamps. A timestamp can correspond to a pair of clock values that include a clock value captured using the first clock and another clock value captured at the second clock. When the DSP 442 is operating to determine whether an invocation phrase has been detected, and the device SoC 444 is in a sleep mode, the DSP 442 can record a clock value corresponding to a "wake" time when an invocation phrase has been detected. When the DSP 442 causes the device SoC 444 to transition out of the sleep mode, a timestamp can be recorded using the first clock and the second clock. However, in order to determine the "wake" time as expressed with respect to the second clock, the second clock value of the timestamp can be "scaled" and/or otherwise adjusted according to a determined time offset between the first clock and the second clock.

The time offset can be determined using a first timestamp and a second timestamp, which can be recorded when both the device SoC 444 and the DSP 442 are both not in a sleep mode. The first timestamp can correspond to a first pair of clock values and the second timestamp can correspond to a second pair of clock values. A first DSP clock value of the first pair of clock values can be subtracted from a second DSP clock value of the second pair of clock values to generate a first clock difference value. Furthermore, a first SoC clock value of the first pair of clock values can be subtracted from a second SoC clock value of the second pair of clock values to generate a second clock difference value. A mapping between the first clock difference value and the second clock different value can thereafter be used when the DSP 442 wakes the device SoC 444, in order to determine when an invocation phrase has been received. For instance, a ratio of the second clock difference value over the first clock difference value can be determined, and the ratio can be multiplied by a DSP clock value in order to determine a corresponding device SoC clock value. For instance, when the DSP 442 wakes the device SoC 444, a DSP clock value corresponding to a time at which a user provided an invocation phrase can be provided to the device SoC 444. The device SoC 444 can then map the DSP clock value to a device SoC clock value, in order to determine when the invocation phrase was provided by the user with respect to the device SoC clock. This value can then be used during processing of audio data, such as during echo cancelation, in order to analyze content of the audio data (e.g., to identify natural language content of spoken utterances from a user).

Figure 5:
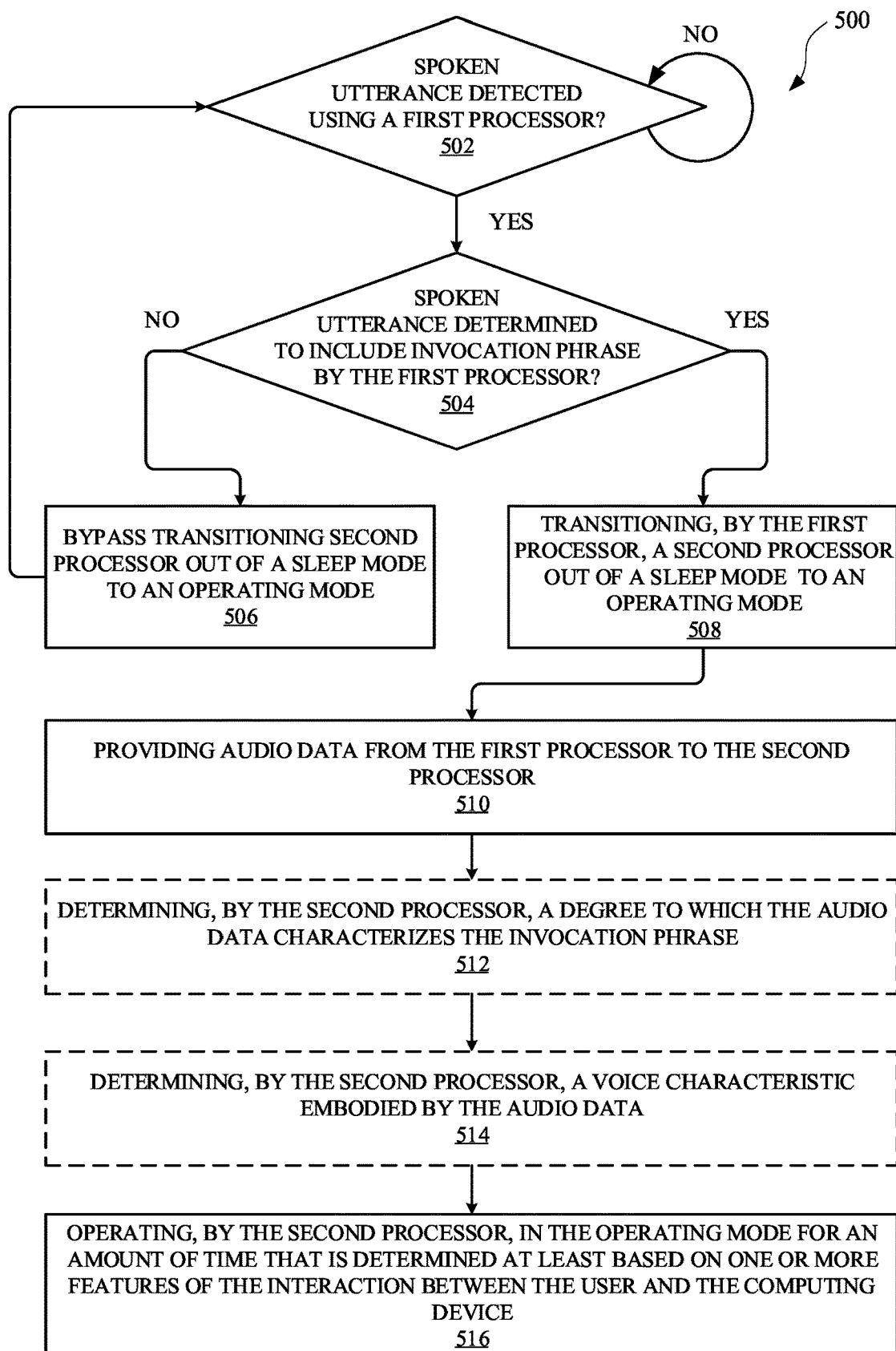
FIG. 5 illustrates a method for initializing a particular processor of a computing device for the amount of time that is selected based on one or more features of an interaction between a user and the computing device.

FIG. 5 illustrates a method 500 for initializing a particular processor of a computing device for the amount of time that is selected based on one or more features of an interaction between a user and the computing device. The method 500 can be performed by one or more processors, applications, and/or any other apparatus and/or module capable of providing an interface between a user and an automated assistant. The method 500 can include an operation 502 of determining whether a first processor has detected the spoken utterance from a user. The first processor can be operational when a second processor is operating in a sleep mode. The sleep mode can be a mode in which the second processor is consuming less power and/or less computational resources relative to an operating mode in which one or more applications, such as an automated assistant, are actively executing via the second processor. In some implementations, the first processor can be a digital signal processor and the second processor can be a device SoC. Both the first processor and the second processor can be incorporated into a computing device that is operating using a rechargeable power source, such as a battery, capacitor, and/or any other rechargeable power source.

The method 500 can proceed to an operation 504 when the first processor has detected a spoken utterance. Otherwise, when no spoken utterance has been detected by the first processor, the first processor can continue to monitor one or more microphones of the computing device in order to determine whether the user has provided a spoken utterance. The operation 504 can include determining, by the first processor, whether the spoken utterance includes a particular invocation phrase. The computing device can operate to transition the second processor out of the sleep mode when a particular invocation phrase, of one or more different invocation phrases, has been provided by the user to the computing device. The invocation phrase can be, for example, "Assistant," and/or any other phrase that can be used to initialize an application. When the first processor determines that the spoken utterance includes the invocation phrase, the method 500 can proceed from the operation 504 to the operation 508.

The operation 508 can include transitioning the second processor out of the sleep mode into an operating mode. The operation 508 can be performed by the first processor in response to the first processor identifying the invocation phrase. However, when the first processor determines that the spoken utterance does not include the invocation phrase, the method 500 can proceed from the operation 504 to the operation 506. The operation 506 can include bypassing transitioning the second processor out of the sleep mode into the operating mode. In other words, because the first processor did not detect the invocation phrase within the spoken utterance, the first processor would return to the operation 502 for determining whether another spoken utterance has been detected.

The method 500 can proceed from the operation 508 to the operation 510, which can include providing audio data from the first processor to the second processor. The audio data can correspond to the spoken utterance provided by the user to the computing device. In some implementations, the first processor can operate a first invocation phrase model for determining whether the spoken utterance includes the invocation phrase, whereas the second processor can operate a second invocation phrase model for determining whether the spoken utterance included the invocation phrase. The first model can correspond to a lower threshold for identifying a correspondence between the spoken utterance and the invocation phrase, we're at the second invocation phrase model can correspond to a higher threshold, relative to the threshold of the first model, for determining the correspondence between the spoken utterance and the invocation praise. Therefore, when the second processor receives the audio data, the second processor can determine whether the spoken utterance includes the invocation phrase using the second invocation phrase model.

The method 500 can include an optional operation 512 of determining, by the second processor, a degree to which the audio data characterizes the invocation phrase. The degree to which the audio data characterizes the invocation phrase can be one or more metrics that quantify one or more similarities between the audio data and the invocation phrase. In this way, the one or more metrics can be subsequently used for making determinations about how to operate the computing device thereafter. For example, a value characterizing the degree to which the audio data characterizes the invocation phrase can be used to determine an amount of time to operate the second processor in the operating mode before transitioning back to the sleep mode (if no other audio data is passed to the second processor for processing).

In some implementations, the method 500 can include an optional operation 514 of determining by the second processor, a voice characteristic embodied by the audio data. The second processor can operate a voice identification model, which can be used to identify, with permission from one or more users, the user (e.g., a corresponding user profile of the user) that has provided the spoken utterance. For example, each user of the computing device can speak with a different and/or a unique voice signature, and based on these differences, the voice identification model can determine a ranking that corresponds to a prediction of which user provided the spoken utterance. The user that corresponds to the highest ranking can be selected as the user who provided the spoken utterance to the computing device. The identification of the user using the voice identification model can be used, with permission from the user, to determine an amount of time to operate the second processor in the operating mode rather than the sleep mode. The amount of time can be based on previous interactions between one or more users and an automated assistant. For example, a greater amount of time can be selected for a user that typically delays between providing invocation phrase in a subsequent command, where as a lesser amount of time can be selected for another user that typically does not delay between providing the invocation phrase and another subsequent command.

The method 500 can further include an operation 516 of operating, by the second processor, in the operating mode for an amount of time that is at least based on one or more features of the interaction between the user and the computing device. For example, in some implementations, the amount of time can be based on the degree to which the audio data characterizes the invocation phrase. Alternatively, or additionally, the amount of time can be based on one or more voice characteristics that embody the audio data, and/or an identification of the user that provided the spoken utterance. Alternatively, or additionally, the amount of time can be based on one or more contextual features corresponding to the interaction between the user and the computing device, such as time of day, number of available computing devices, network strength, number of users present within a certain proximity of the computing device, and/or any other features that can be associated with the interaction between the user and of the computing device.

Figure 6:
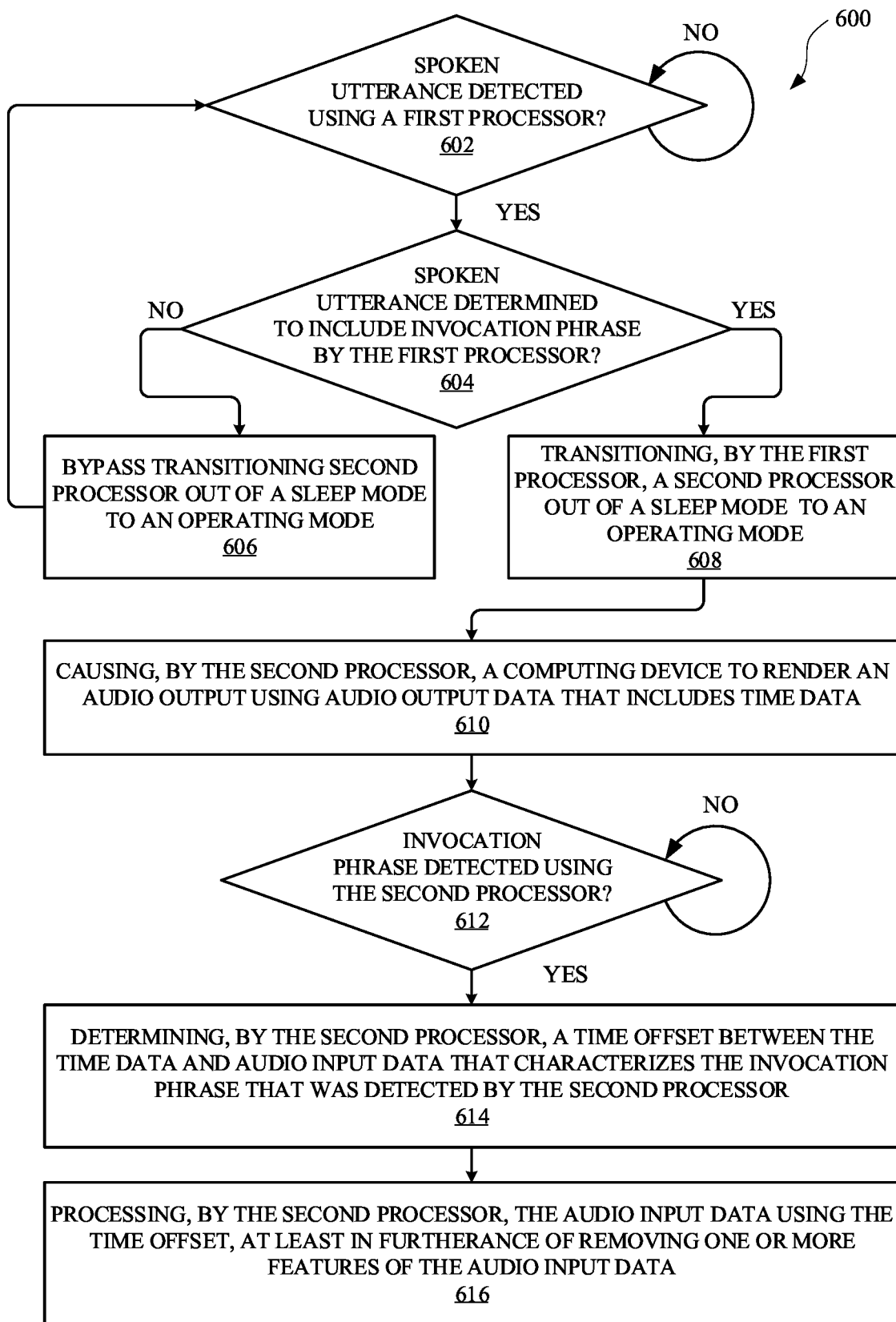
FIG. 6 illustrates a method for processing audio data using a determined time offset corresponding to differences in operations between a first processor and a second processor.

FIG. 6 illustrates a method 600 for processing audio data using a determined time offset corresponding to differences in operations between a first processor and a second processor. The method 600 can be performed by one or more processors, applications, and/or any other apparatus or module capable of processing audio data. The first processor and the second processor identified in the method 600 can be incorporated into a computing device that is powered by a portable power supply, such as a battery and/or a capacitor, and provides access to an automated assistant. The method 600 can include an operation 602 of determining, by the first processor, whether a spoken utterance was received at the computing device, and/or another device that is in communication with the computing device. Specifically, the first processor can process an output from one or more microphones to determine whether a user has provided a spoken utterance to the one or more microphones. When the first processor determines that the spoken utterance was not received, the first processor can continue to monitor output of the one or more microphones to determine whether a spoken utterance has been received by one or more users.

When the first processor determines that a spoken utterance has been detected, the method 600 can proceed from the operation 602 to the operation 604. The operation 604 can include determining whether the spoken utterance included an invocation phrase. The first processor can determine whether the spoken utterance included the invocation phrase by employing a first location phrase model, which can be executed by the first processor. Specifically, the first invocation phrase model can be used to analyze output of the one or more microphones in order to determine whether the spoken utterance included the invocation phrase. When the spoken utterance is determined to have included the invocation phrase, the method 600 can proceed from the operation 604 to the operation 608.

The operation 608 can include transitioning the second processor out of a sleep mode and into an operating mode. The operation 608 can be initialized by the first processor in response to determining that the spoken utterance included the invocation phrase. When the first processor determines that the spoken utterance did not include the invocation phrase, the method 600 can proceed from the operation 604 to the operation 606. The operation 606 can include bypassing transitioning the second processor out of the sleep mode and into the operating mode, and instead of transitioning the second processor out of the sleep mode, the method 600 can return to the operation 602 for detecting whether a subsequent spoken utterance has been provided to the one or more microphones.

The method 600 can further include an operation 610 of causing, by the second processor, the computing device to render audio output using audio output data. The audio output can be provided via one or more interfaces that are connected to the computing device. For example, the computing device can include one or more speakers for emitting audio, and/or the computing device can be in communication with another computing device that includes one or more speakers. The audio output data can be based on data received over a network that the computing device is connected to and/or based on data that is stored in a memory of the computing device. For example, the audio output can be music that is rendered using audio data corresponding to music that is stored in a memory device of the computing device. The audio output data can include or associated with time data, which indicates times at which portions of audio has been rendered by the computing device and/or output by one or more speakers.

The method 600 can proceed to an operation 612 of determining whether an invocation phrase has been detected using the second processor. In some implementations, the first processor can be a digital signal processor and the second processor can be a device SoC. The first processor can operate a first speech recognition model and the second processor can operate a second speech recognition model. The first speech recognition model can have a lower threshold for determining whether a spoken utterance includes an invocation phrase, and the second speech recognition model can have a higher threshold for determining whether a spoken utterance includes the invocation phrase. In some implementations, the first processor can process audio data of lower quality than the audio data that is processed by the second processor. For example, the first processor can monitor an output of one or more microphones of the computing device at a lower sampling rate relative to a sampling rate at which the second processor monitors the one or more microphones. Alternatively, or additionally, the first processor can monitor a lower total number of audio channels relative to a number of audio channels monitored by the second processor. For example, the first processor can monitor a single microphone for determining whether a spoken utterance was provided by a user, and the second processor can monitor two or more microphones to determine whether a spoken utterance and/or invocation phrase with provided by a user.

The second processor can monitor an output of one or more microphones while the audio output is being rendered by the computing device. When the second processor determines that the invocation phrase has been provided by a user, the method 600 can proceed from the operation 612 to an operation 614. When the second processor has not determined that an invocation phrase was provided by user, the second processor can continue to monitor an output of one or more microphones of the computing device. The operation 614 can include determining, by the second processor, a time offset between the time data and audio input data that characterizes the invocation phrase that was detected by the second processor. In some implementations, the time offset can be based on a difference between clock operating characteristics of a clock of the first processor and another clock of the second processor. However, in some implementations, the first processor and the second processor can operate according to a single clock.

The method 600 can further include an operation 616 of processing by the second processor the audio input data using the time offset, at least in furtherance of removing one or more features of the audio input data. Specifically, the time offset can be used during echo cancellation, in order to remove features of the rendered audio output from the audio input provided to the one or more microphones. By considering the time offset between the first processor and the second processor, errors that would otherwise be apparent during the echo cancellation process can be eliminated. This can lead to less latency between a user providing a spoken utterance and an automated assistant responding to the spoken utterance. Furthermore, because the computing device operates via a rechargeable power source, an operational time for each completed charge of the power source can be extended by reducing latency and total operating time for at least the second processor.

Figure 7:
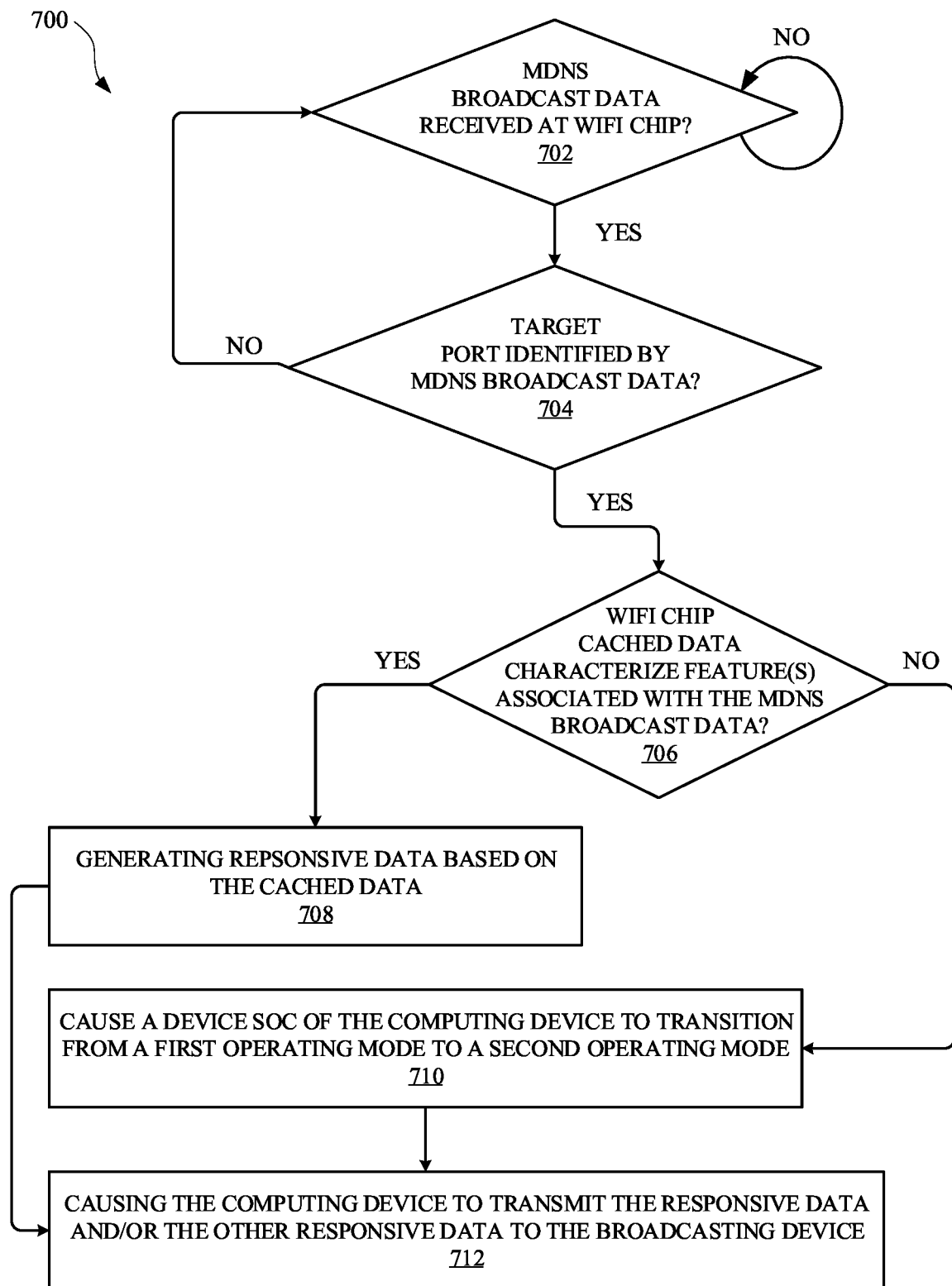
FIG. 7 illustrates a method for providing responsive data to a broadcasting device using a WiFi chip, which is included in a computing device that is battery powered.

FIG. 7 illustrates a method 700 for providing responsive data to a broadcasting device using a WiFi chip, which is included in a computing device that is battery powered. The method can be performed by one or more applications, processors, and/or any other apparatus or module capable of processing network data. The method 700 can include an operation 702 of determining whether mDNS broadcast data has been received at a WiFi chip. When mDNS broadcast data is determined to have been received at the WiFi chip, the method 700 can proceed to an operation 704. The operation 704 can include determining whether a particular target port is identified by the mDNS broadcast data. When the mDNS broadcast data is not received at the WiFi chip at operation 702, the WiFi chip can continue to monitor network traffic to determine whether any packets of data received at the WiFi chip correspond to mDNS broadcast data.

When the mDNS broadcast data identifies a particular target port, such as a port that has been designated for casting media between client devices, the method 700 can proceed from the operation 704 to the operation 706. The operation 706 can include determining whether cached data stored in a memory of the WiFi chip characterizes one or more features of the mDNS broadcast data. When the mDNS broadcast data does not identify a particular target port, the method 700 can proceed from the operation 704 to the operation 702, in which the WiFi chip can continue to monitor the network traffic.

In some implementations, at the operation 706, the WiFi chip can compare the mDNS broadcast data to cached data stored in a memory of the WiFi chip. For example, the WiFi chip can store packets of data previously provided over a network, and/or data that has been generated in response to packets received over the network. For instance, the WiFi chip could have previously responded to a cast request from another broadcasting device by indicating that a computing device that includes the WiFi chip includes an application that is also included at the other broadcasting device. Alternatively, or additionally, data stored in the memory of the WiFi chip can indicate whether one or more services are capable of being employed by the computing device via a broadcasting request. Alternatively, or additionally, data stored in the memory of the WiFi chip can indicate one or more hardware features of the computing device. Alternatively, or additionally, the WiFi chip can determine whether the cached data stored by the WiFi chip characterizes one or more features associated with the mDNS broadcast data. In this way, the WiFi chip can be responsive to broadcasted requests over the network, without waking up another processor of the computing device, such as a device SoC.

The method 700 can proceed from the operation 706 to the operation 708, which can include generating responsive data based on the cached data. The operation 708 can be performed when the WiFi chip has cached data that characterizes one or more features associated with the mDNS broadcast data. For example, when the cached data identifies an application that is the subject of the mDNS broadcast, the WiFi chip can generate the responsive data in order to indicate to the broadcasting device that the computing device does include that particular application. In this way, the computing device would not need to wake up another processor in order to respond to the broadcast data, thereby eliminating waste of computational resources and/or power resources, which can be limited for battery powered devices.

When the cached data of the WiFi chip does not characterize one or more features associated with the mDNS broadcast data, the method 700 can proceed from the operation 706 to the operation 710. The operation 710 can include causing a device SoC of the computing device to transition from a first operating mode to a second operating mode. In some implementations, the first operating note can be a mode in which the device SoC is performing less processes compared to the second operating mode. Alternatively, or additionally, the first operating mode can correspond to lower power consumption by the device SoC relative to power consumption of the device SoC when operating in the second operating mode.

The method 700 can proceed from the operation 708 and/or the operation 710, to the operation 712. The operation 712 can include, causing the computing device to transmit the responsive data, and/or the other responsive data, to be broadcast. The other responsive data can be generated at least in part by the device SoC when the operation 712 is performed. For example, when the cached data does not identify a particular feature such, as a service associated with the mDNS broadcast data, the device SoC can be employed to generate the other responsive data, which can identify one or more features associated with the mDNS broadcast data using data that is accessible to the device SoC. In some implementations, the cached data can be updated by the WiFi chip and/or the device SoC when the WiFi chip is tasked with transmitting data that was otherwise not accessible via the memory of the WiFi chip. In this way, subsequent queries or requests from other client devices over the network can be responded to by the WiFi chip without waking up the device SoC, thereby eliminating waste of power and computational resources.

Figure 8:
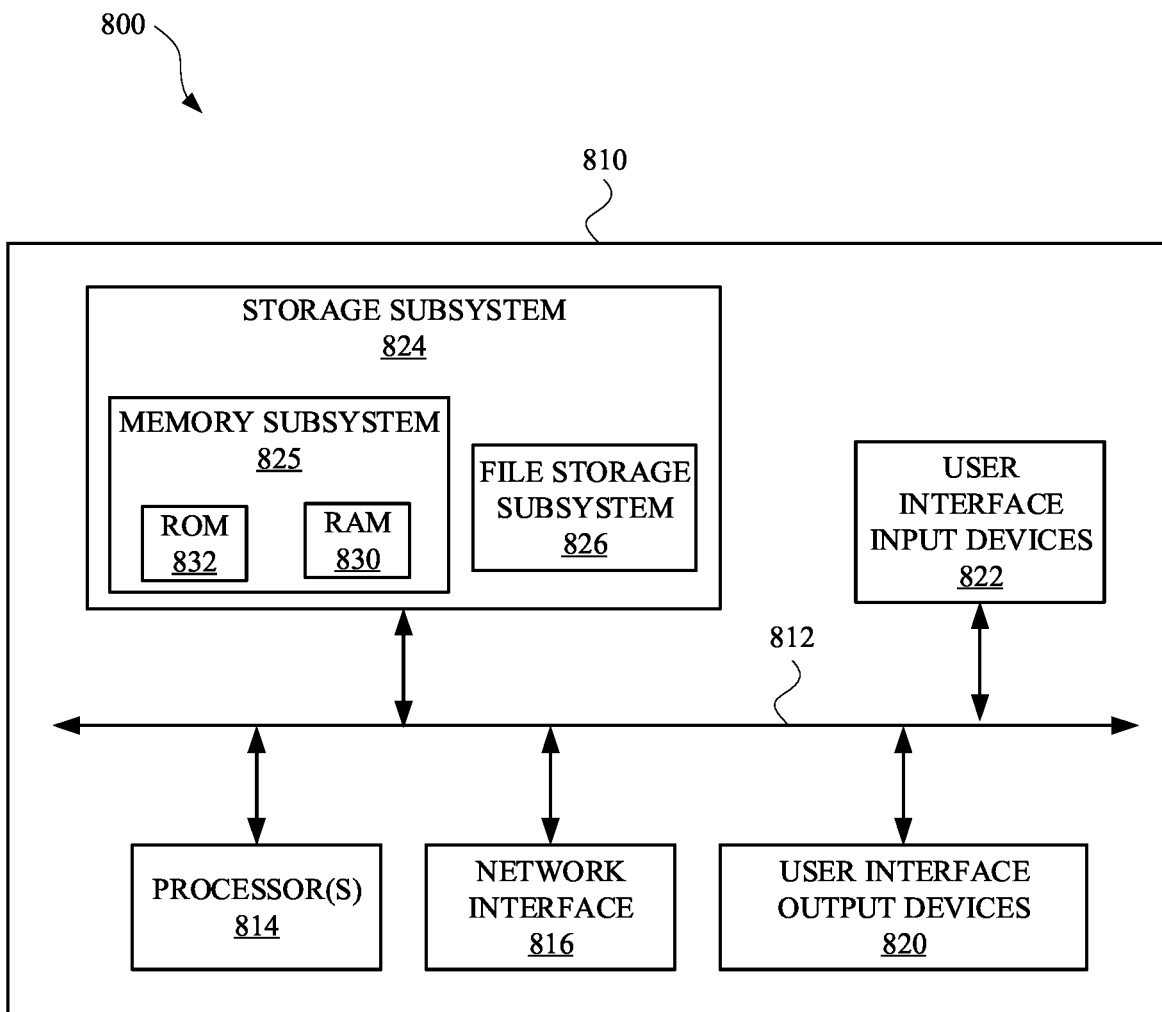
FIG. 8 is a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 500, method 600, method 700, and/or to implement one or more of first client device 134, second client device 102, third client device 112, client device 202, client device 302, server device 402, computing device 418, and/or any other engine, module, chip, processor, application, etc., discussed herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before the data is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is set forth as including operations such as processing, at a first processor of a computing device, output of a microphone, the output corresponding to a spoken utterance provided by a user to the microphone, wherein the computing device includes a second processor that is operating in a sleep mode when the spoken utterance is provided by the user. The method can further include determining, at the first processor, whether the output at least partially corresponds to an invocation phrase for invoking an automated assistant that is accessible via the computing device. The method can further include, when the first processor determines that the output at least partially corresponds to the invocation phrase: causing, by the first processor, the second processor to transition from the sleep mode into an operating mode; providing, by the first processor and to the second processor, data that characterizes the output of the microphone; determining, by the second processor and based on the data received from the first processor, a degree to which the data characterizes the invocation phrase; determining, by the second processor, an amount of wake time for the second processor to remain in the operating mode based on the degree to which the data characterizes the invocation phrase; and causing, based on determining the amount of wake time for the second processor, the second processor to operate in the operating mode for at least the amount of wake time.

In some implementations, the method can further include, when the second processor is operating in the operating mode for at least the amount of wake time: receiving, at the second processor and from the first processor, additional data characterizing a separate spoken utterance from the user or another user, and causing, by the second processor, the automated assistant to be responsive to the separate spoken utterance based on the additional data. In some implementations, the first processor operates a first speech recognition model and the second processor operates a second speech recognition model that is different from the first speech recognition model. In some implementations, the first speech recognition model is associated with a first accuracy threshold for determining another degree to which the data characterizes the invocation phrase, and the second speech recognition model is associated with a second accuracy threshold, which is different from the first accuracy threshold, for determining the degree to which the data characterizes the invocation phrase. In some implementations, the second accuracy threshold is satisfied by a greater degree of correlation between a spoken input and the invocation phrase, and the greater degree of correlation is relative to a degree of correlation for satisfying the first accuracy threshold.

In some implementations, the first processor is a digital signal processor (DSP), the second processor is a device system on a chip (SoC), and the computing device includes one or more batteries that provide power to the first processor and the second processor when the device SoC is in the operating mode. In some implementations, determining the amount of wake time for the second processor to remain in the operating mode includes identifying a previously determined amount of wake time designated for the second processor; and the previously determined amount of wake time is based on one or more interactions between the user and the automated assistant prior to the user providing the spoken utterance. In some implementations, the method can further include, when the first processor determines that the output does not at least partially correspond to the invocation phrase: bypassing, by the first processor, causing the second processor to transition from the sleep mode to the operating mode.

In some implementations, the method can further include, when the first processor determines that the output at least partially corresponds to the invocation phrase: determining, by the second processor and based on the data that characterizes the output of the microphone, a user voice characteristic characterized by the output of the microphone, wherein determining the amount of wake time for the second processor to remain in the operating mode is further based on the user voice characteristic characterized by the output of the microphone.

In other implementations, a method is set forth as including operations such as processing, at a first processor of a computing device, output of a microphone, the output corresponding to a spoken utterance provided by a user to the microphone, wherein the computing device includes a second processor that is operating in a sleep mode when the spoken utterance is provided by the user. In some implementations, the method can further include determining, at the first processor, whether the output at least partially corresponds to an invocation phrase for invoking an automated assistant that is accessible via the computing device. In some implementations, the method can further include, when the first processor determines that the output at least partially corresponds to the invocation phrase: causing, by the first processor, the second processor to transition from the sleep mode into an operating mode, determining, by the second processor, a voice characteristic characterized by the output of the microphone; determining, by the second processor and based on the voice characteristic characterized by the output, an amount of wake time for the second processor to remain in the operating mode; and causing, based on determining the amount of wake time for the second processor, the second processor to operate according to the operating mode for at least the amount of wake time.

In some implementations, the method can further include, subsequent to the second processor operating according to the operating mode and when the second processor is subsequently operating according to the sleep mode: determining, at the first processor of the computing device, that another output from the microphone at least partially corresponds to the invocation phrase for invoking the automated assistant, wherein the other input is provided in response to a separate user providing a separate spoken utterance to the microphone; causing, by the first processor, the second processor to transition from the sleep mode into the operating mode; determining, by the second processor and based on the other output, another voice characteristic characterized by the other output from the microphone; determining, by the second processor and based on the voice characteristic characterized by the other output, another amount of wake time for the second processor to remain in the operating mode, wherein the other amount of wake time is different from the amount of wake time; and causing, based on determining the amount of wake time for the second processor, the second processor to operate according to the operating mode for at least the other amount of wake time.

In some implementations, the second processor operates a voice characteristic model when determining whether the spoken utterance was provided by the user and/or the separate user to the microphone. In some implementations, the computing device includes one or more batteries that provide power to the first processor and the second processor when the second processor is operating according to the operating mode. In some implementations, the amount of wake time is based on one or more interactions between the user and the automated assistant prior to the user providing the spoken utterance.

In yet other implementations, a method is set forth as including operations such as determining, by a processor of a computing device, that an input to a microphone of the computing device at least partially corresponds to an invocation phrase for invoking an automated assistant that is accessible via the computing device. The method can further include causing, by the processor and based on the input to the microphone, another processor of the computing device to transition from a sleep mode into an operating mode. The method can further include, subsequent to the other processor transitioning from the sleep mode into the operating mode: generating, by the other processor, first data that characterizes an audio output provided by the computing device via one or more speakers that are in communication with the computing device, wherein the first data includes first time data that characterizes a time at which the other processor generated the first data; determining, by the processor, that another input has been provided to the microphone of the computing device; generating, by the processor, second data that characterizes the other input to the microphone of the computing device, wherein the second data includes second time data that characterizes another time at which the processor generated the second data; determining, by the other processor, a time offset between the time at which the other processor generated the first data and the other time at which the processor generated the second data; processing, by the other processor, the second data using the time offset in furtherance of removing one or more features of the audio output provided by the one or more speakers; determining, by the other processor and based on processing the second data using the time offset, whether the other input to the microphone corresponds to a spoken utterance to invoke the automated assistant that is accessible via the computing device. The method can further include, when the other input to the microphone is determined to correspond to the spoken utterance to invoke the automated assistant: causing, by the other processor, the automated assistant to provide responsive output via an interface that is in communication with the computing device.

In some implementations, processing the second data using the time offset in furtherance of removing one or more features of the audio output includes performing an acoustic echo cancellation (AEC) process using the second data and the audio data. In some implementations, the time offset corresponds to a difference in clock operating characteristics of a clock of the processor and another clock of the other processor. In some implementations, the time offset is based on a difference between: a first clock value determined using the clock, and a second clock value determined using the other clock. In some implementations, the first clock value and the second clock value are determined when the other processor is in the operating mode. In some implementations, the time offset is determined by multiplying a ratio of differences between clock values by a time value corresponding to the other time. In some implementations, the computing device includes one or more batteries that provide power to the processor and the other processor when the other processor is operating according to the operating mode. In some implementations, the processor is a digital signal processor (DSP) and the other processor is a device system on a chip (SoC).

In yet other implementations, a method is set forth as including operations such as receiving, from a broadcasting device and at a WiFi chip of a computing device, multicast domain name system (mDNS) broadcasted data from the broadcasting device, wherein the computing device includes a device system on a chip (SoC) that is operating in a first operating mode when the WiFi chip of the computing device receives the mDNS broadcasted data. The method can further include determining, by the WiFi chip and based on the mDNS broadcasted data, whether a target port identified by the mDNS broadcasted data corresponds to a particular port that is accessible via the computing device. The method can further include, when the target port identified by the mDNS broadcasted data corresponds to the particular port accessible via the computing device: accessing, based on the target port corresponding to the particular port, cached broadcast device data that is stored in a memory device that is accessible to the WiFi chip when the device SoC is operating in the first operating mode; determining, based on the cached broadcast device data stored in the memory, whether the cached broadcast device data characterizes one or more features of the broadcasting device specified by the mDNS broadcasted data; and, when the cached broadcast device data characterizes one or more features of the broadcasting device: generating, based on the cached broadcast device data, responsive data; and transmitting the responsive data to the broadcasting device.

In some implementations, the method can further include, when the target port identified by the mDNS broadcasted data corresponds to the particular port accessible via the computing device, and when the cached broadcast device data does not characterize one or more features of the broadcasting device: causing, based on the cached broadcast device data not characterizing the one or more features, the device SoC to transition from the first operating mode to a second operating mode, wherein the second operating mode is associated with higher power consumption by the device SoC compared to power consumption of the device SoC when operating in the first operating mode.

In some implementations, the computing device includes one or more batteries that provide power to the WiFi chip and the device SoC when the device SoC is operating according to the second operating mode. In some implementations, determining whether the cached broadcast device data characterizes the one or more features of the broadcasting device includes: determining whether the cached broadcast device data identifies an application that initialized transmitting of the mDNS broadcasted data from the broadcasting device. In some implementations, determining whether the cached broadcast device data characterizes the one or more features of the broadcasting device includes: determining whether the cached broadcast device data identifies a service that is being requested by the broadcasting device. In some implementations, the method can further include, when the target port identified by the mDNS broadcasted data corresponds to the particular port accessible via the computing device, and when the cached broadcast device data does not characterize one or more features of the broadcasting device: causing the device SoC to generate other responsive data based on the mDNS broadcasted data, and transmitting, by the WiFi chip the other responsive data to the broadcasting device.

We claim:

1. A method, comprising:
   receiving, from a broadcasting device and at a WiFi chip of a computing device, multicast domain name system (mDNS) broadcasted data from the broadcasting device,
      wherein the computing device includes a device system on a chip (SoC) that is operating in a first operating mode when the WiFi chip of the computing device receives the mDNS broadcasted data;
   determining, by the WiFi chip and based on the mDNS broadcasted data, whether a target port identified by the mDNS broadcasted data corresponds to a particular port that is accessible via the computing device;
   when the target port identified by the mDNS broadcasted data corresponds to the particular port accessible via the computing device:
      accessing, based on the target port corresponding to the particular port, cached broadcast device data that is stored in a memory device that is accessible to the WiFi chip when the device SoC is operating in the first operating mode,
      determining, based on the cached broadcast device data stored in the memory, whether the cached broadcast device data characterizes one or more features of the broadcasting device specified by the mDNS broadcasted data,
      when the cached broadcast device data characterizes one or more features of the broadcasting device:
         generating, based on the cached broadcast device data, responsive data; and
         transmitting the responsive data to the broadcasting device.

2. The method of claim 1, further comprising:
   when the target port identified by the mDNS broadcasted data corresponds to the particular port accessible via the computing device, and when the cached broadcast device data does not characterize one or more features of the broadcasting device:
      causing, based on the cached broadcast device data not characterizing the one or more features, the device SoC to transition from the first operating mode to a second operating mode, wherein the second operating mode is associated with higher power consumption by the device SoC compared to power consumption of the device SoC when operating in the first operating mode.

3. The method of claim 2, wherein the computing device includes one or more batteries that provide power to the WiFi chip and the device SoC when the device SoC is operating according to the second operating mode.

4. The method of claim 1, wherein determining whether the cached broadcast device data characterizes the one or more features of the broadcasting device includes:
   determining whether the cached broadcast device data identifies an application that initialized transmitting of the mDNS broadcasted data from the broadcasting device.

5. The method of claim 4, wherein determining whether the cached broadcast device data characterizes the one or more features of the broadcasting device includes:
   determining whether the cached broadcast device data identifies a service that is being requested by the broadcasting device.

6. The method of claim 1, wherein determining whether the cached broadcast device data characterizes the one or more features of the broadcasting device includes:
   determining whether the cached broadcast device data identifies a service that is being requested by the broadcasting device.

7. The method of claim 1, further comprising:
   when the target port identified by the mDNS broadcasted data corresponds to the particular port accessible via the computing device, and when the cached broadcast device data does not characterize one or more features of the broadcasting device:
      causing the device SoC to generate other responsive data based on the mDNS broadcasted data, and
      transmitting, by the WiFi chip the other responsive data to the broadcasting device.

8. A portable computing device, comprising:
   one or more speakers;
   one or more batteries;
   a device system on a chip (SoC) at least selectively powered by the one or more batteries;
   a WiFi chip at least selectively powered by the one or more batteries;
   wherein the WiFi chip at least selectively executes stored WiFi chip instructions to:
      receive, from a broadcasting device and via local network, multicast domain name system (mDNS) broadcasted data,
         wherein the device SoC is operating in a first operating mode when the WiFi chip receives the mDNS broadcasted data;

determine, based on the mDNS broadcasted data, whether a target port identified by the mDNS broadcasted data corresponds to a particular port that is accessible via the portable computing device;

when the target port identified by the mDNS broadcasted data corresponds to the particular port accessible via the computing device:

access, based on the target port corresponding to the particular port, cached broadcast device data that is stored in a memory device that is accessible to the WiFi chip when the device SoC is operating in the first operating mode, determine, based on the cached broadcast device data stored in the memory, whether the cached broadcast device data characterizes one or more features of the broadcasting device specified by the mDNS broadcasted data, when the cached broadcast device data characterizes one or more features of the broadcasting device:

generate, based on the cached broadcast device data, responsive data; and transmit, via the local network, the responsive data to the broadcasting device.

9. The portable computing device of claim 8, wherein the WiFi chip, in executing the stored WiFi chip instructions, is further to:

when the target port identified by the mDNS broadcasted data corresponds to the particular port accessible via the computing device, and when the cached broadcast device data does not characterize one or more features of the broadcasting device:

cause, based on the cached broadcast device data not characterizing the one or more features, the device SoC to transition from the first operating mode to a second operating mode, wherein the second operating mode is associated with higher power consumption by the device SoC compared to power consumption of the device SoC when operating in the first operating mode.

10. The portable computing device of claim 9, wherein the one or more batteries provide power to the device SoC only when the device SoC is operating according to the second operating mode.

11. The portable computing device of claim 8, wherein in determining whether the cached broadcast device data characterizes the one or more features of the broadcasting device, the WiFi chip is to:

determine whether the cached broadcast device data identifies an application that initialized transmitting of the mDNS broadcasted data from the broadcasting device.

12. The portable computing device of claim 11, wherein in determining whether the cached broadcast device data characterizes the one or more features of the broadcasting device, the WiFi chip is to:

determine whether the cached broadcast device data identifies a service that is being requested by the broadcasting device.

13. The portable computing device of claim 8, wherein in determining whether the cached broadcast device data characterizes the one or more features of the broadcasting device, the WiFi chip is to:

determine whether the cached broadcast device data identifies a service that is being requested by the broadcasting device.

14. The portable computing device of claim 8, wherein the WiFi chip, in executing the stored WiFi chip instructions, is further to:

when the target port identified by the mDNS broadcasted data corresponds to the particular port accessible via the computing device, and when the cached broadcast device data does not characterize one or more features of the broadcasting device:

cause the device SoC to generate other responsive data based on the mDNS broadcasted data, and transmit, via the local network, the other responsive data to the broadcasting device.

15. A non-transitory computer-readable storage medium comprising instructions, which, when executed by a WiFi chip of a computing device, cause the WiFi chip to:

receive, from a broadcasting device and at the WiFi chip, multicast domain name system (m DNS) broadcasted data from the broadcasting device, wherein the computing device includes a device system on a chip (SoC) that is operating in a first operating mode when the WiFi chip of the computing device receives the mDNS broadcasted data;

determine, based on the mDNS broadcasted data, whether a target port identified by the mDNS broadcasted data corresponds to a particular port that is accessible via the computing device;

when the target port identified by the mDNS broadcasted data corresponds to the particular port accessible via the computing device:

access, based on the target port corresponding to the particular port, cached broadcast device data that is stored in a memory device that is accessible to the WiFi chip when the device SoC is operating in the first operating mode, determine, based on the cached broadcast device data stored in the memory, whether the cached broadcast device data characterizes one or more features of the broadcasting device specified by the mDNS broadcasted data, when the cached broadcast device data characterizes one or more features of the broadcasting device:

generate, based on the cached broadcast device data, responsive data;

and transmit the responsive data to the broadcasting device.

* * * * *